United States Patent
Dhananjay et al.

(10) Patent No.: US 9,369,328 B2
(45) Date of Patent: Jun. 14, 2016

(54) SYSTEM AND METHOD FOR PROVIDING CHANNEL EQUALIZATION IN ORTHOGONAL FREQUENCY DIVISION MULTIPLEXING (OFDM) WIRELESS SYSTEMS

(71) Applicant: New York University, New York, NY (US)

(72) Inventors: Aditya Dhananjay, New York, NY (US); Jinyang Li, New York, NY (US); Sundeep Rangan, Jersey City, NJ (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 14/643,278

(22) Filed: Mar. 10, 2015

(65) Prior Publication Data
US 2015/0256377 A1   Sep. 10, 2015

Related U.S. Application Data

(60) Provisional application No. 61/950,586, filed on Mar. 10, 2014.

(51) Int. Cl.
| | | |
|---|---|---|
| *H04L 27/26* | (2006.01) | |
| *H04L 25/02* | (2006.01) | |
| *H04L 5/00* | (2006.01) | |

(52) U.S. Cl.
CPC ........ *H04L 27/2649* (2013.01); *H04L 25/0202* (2013.01); *H04L 25/0232* (2013.01); *H04L 5/0048* (2013.01); *H04L 25/023* (2013.01)

(58) Field of Classification Search
CPC .............. H04L 25/0232; H04L 25/023; H04L 25/0234; H04L 27/2649; H04L 25/0202; H04L 5/0048
See application file for complete search history.

(56) References Cited

U.S. PATENT DOCUMENTS 8,170,127 B2 * 5/2012 Atungsiri .............. H04L 1/0668
                                                            370/203

OTHER PUBLICATIONS

Nokia Siemens Networks, "2020: Beyond 4G Radio Evolution for the Gigabit Experience," 2012.
Theodore Rappaport et al., "Millimeter Wave Mobile Communications for 5G Cellular: It Will Work!," Electronics Letters, vol. 40, No. 23, 2004.

(Continued)

*Primary Examiner* — Sophia Vlahos
(74) *Attorney, Agent, or Firm* — Andrews Kurth LLP

(57) ABSTRACT

The present disclosure relates to a computer-implemented method for estimating a communication channel response, comprising procedures such as: receiving, via the channel, a signal comprising a plurality of symbols, each comprising a plurality of sub-carriers; determining a pilot sub-carrier response and a pilot sub-carrier metric for one or more pilot sub-carriers; and for one or more non-pilot sub-carriers: i) determining a non-pilot sub-carrier metric; ii) if the non-pilot sub-carrier metric satisfies a criterion, determining a particular component (e.g., real or imaginary) of a non-pilot sub-carrier response as a function of different components of one or more pilot sub-carrier responses; and iii) if the non-pilot sub-carrier metric does not satisfy the criterion, determine the particular component of the non-pilot sub-carrier response as a function of the particular component of one or more pilot sub-carrier responses. Other embodiments include a communication apparatus and a computer-readable medium configurable to perform such procedures.

26 Claims, 11 Drawing Sheets

(56) References Cited

OTHER PUBLICATIONS

M. Cudak, et al, "Moving towards mmwave-based beyond-4g (b-4g) technology," in Vehicular Technology Conference (VTC Spring), 2013 IEEE 77th, 2013.

D. Halperin, et al, "Augmenting data center networks with multi-gigabit wireless links," in Proceedings of ACM SIGCOMM 2011.

Robert Daniels, et al, "60 GHz Wireless: Up Close and Personal," IEEE Microwave Magazine, 2010.

Gerard J. M. Janssen, et al, "Wideband Indoor Channel Measurements . . . Selective Multipath Channels at 2.4, 4.75, and 11.5 GHz," IEEE Transactions on Comm. vol. 44, No. 10, 1996.

Theodore Rappaport, et al., "28 GHz Propagation Measurements for Outdoor Cellular Communications Using Steerable Beam Antennas in NYC," in IEEE Int'l Conf on Comm (ICC), 2013.

H. Minn, M. Zeng, and V. K. Bhargava, "On Timing Offset Estimation for OFDM Systems," IEEE Communications Letters, vol. 4, No. 7, 2000.

Tiejun Lv, et al, "Joint Estimation of Symbol Timing . . . Offset of OFDM Signals Over Fast Time-Varying Multipath Channels," IEEE Transactions on Signal Processing vol. 53, 2005.

J.-J. van de Beek, M. Sandell, and P. Borjesson, "MI estimation of time and frequency offset in ofdm systems," Signal Processing, IEEE Transactions on, vol. 45, No. 7, 1997.

Timothy Schmidl and Donald Cox, "Robust frequency and timing synchronization for OFDM," IEEE Transactions on Communications, vol. 45, Dec. 1997.

Qi Wang, et al, "Measurement Based Throughput Evaluation of Residual Frequency Offset Compensation in WiMAX," 51st Annual Symposium ELMAR, 2009.

David Smalley, "Equalization Concepts: A Tutorial," Application Report, Texas Instruments, 1994.

Theodore Rappaport et al., "28 GHz Millimeter Wave Cellular . . . Measurements for Reflection & Penetration Loss in & around Buildings in NYC," in IEEE Int'l Conf on Comm (ICC)2013.

Theodore Rappaport, et al., "28 GHz Angle of Arrival and Angle of Departure . . . Cellular Communications using Steerable Beam Antennas in NYC," in IEEE Vehicular Tech Conf VTC 2013.

* cited by examiner

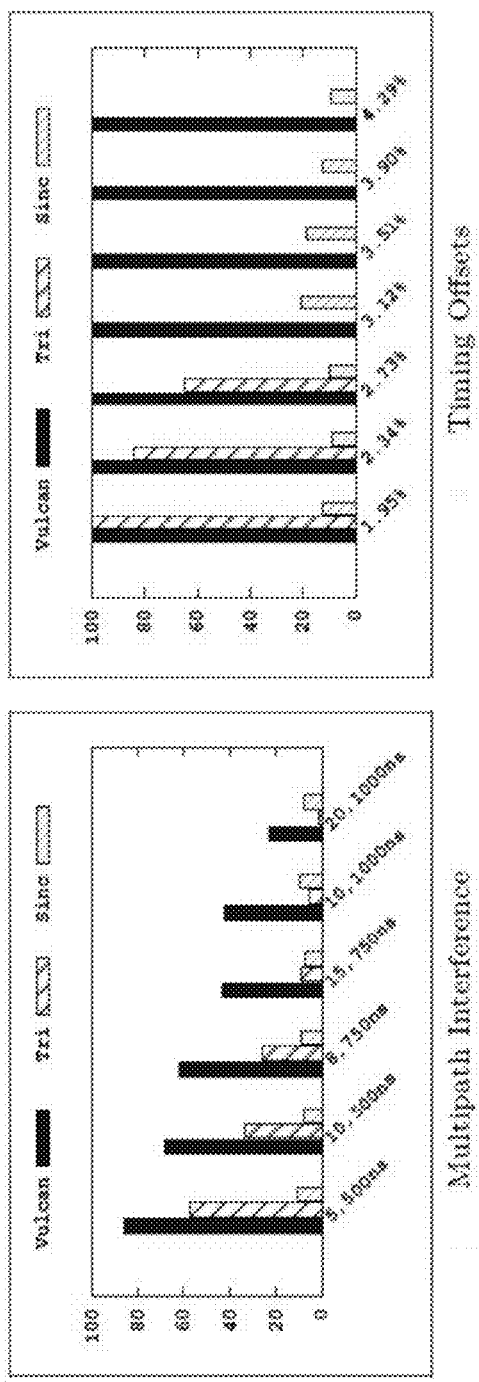
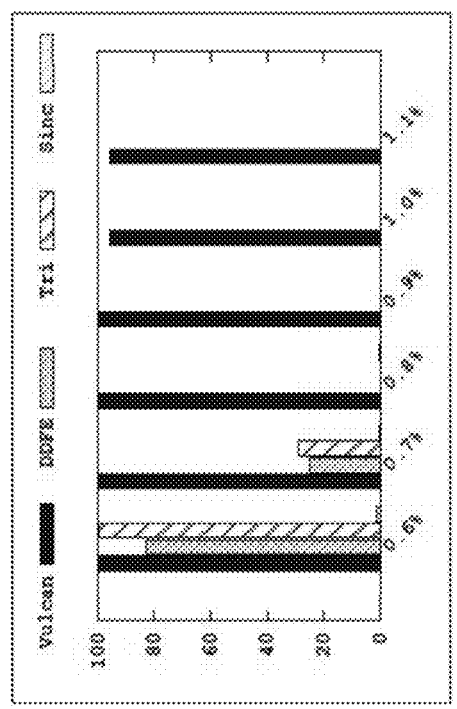
Figure 5A
Figure 5B
Figure 5C

SYSTEM AND METHOD FOR PROVIDING CHANNEL EQUALIZATION IN ORTHOGONAL FREQUENCY DIVISION MULTIPLEXING (OFDM) WIRELESS SYSTEMS

CROSS-REFERENCE TO RELATED APPLICATION(S)

This application is based upon and claims the benefit of priority from U.S. Patent Application Ser. No. 61/950,586, both filed Mar. 10, 2014, the entire disclosure of which is incorporated herein by reference.

FIELD OF THE DISCLOSURE

The present application relates to generally to the field of wireless communication systems, and more specifically to improving the performance of orthogonal frequency division multiplexing (OFDM) receivers that estimate the response of a wireless channel based on pilot sub-carriers interspersed with data or other non-pilot sub-carriers.

BACKGROUND INFORMATION

An explosion in the number of wireless broadband users has led to a severe spectrum shortage in the conventional cellular bands. The demand for cellular data services is expected to grow at a staggering rate, necessitating orders of magnitude increases in wireless capacity [see, e.g., Refs. 1, 2]. Millimeter wave (mmW) frequencies at 28, 38, and 60 GHz have been attracting growing attention as a possible candidate for next-generation microcellular networks [see, e.g., Refs. 3-5]. This band offers orders of magnitude greater spectrum and also allows for building high dimensional antenna arrays for further gains via beamforming and spatial multiplexing. Devices based on mmW have already hit the market, but are limited by their use of highly directional horn antennas to enable short-range, line-of-sight links, within a controlled and static environment, such as in a data center [see, e.g., Ref. 6]. Since such an environment and conditions are very difficult—if not impossible—to achieve in a practical system implement, there is a need for building mmW orthogonal frequency division multiplexing (OFDM) systems "in the wild," e.g., where line-of-sight is not always available, SNRs are lower, mobility is enabled, and the use of static directional antennas is infeasible.

One of the biggest challenges [see, e.g., Ref. 7] in building such mmW OFDM systems is performing accurate channel estimation and equalization because the channel varies rapidly across OFDM subcarriers and/or symbol indices (see FIG. 1). As discussed in more detail herein, there are many reasons for these variations, such as multipath interference, Doppler shifts, and time frequency offsets, which are further exacerbated in mmW frequencies, leading to very rapid channel variations. Existing interpolation mechanisms for interpolating between channel estimates at widely-spaced pilot symbols (9) are not capable of tracking these variations within reasonable bounds of error without requiring prohibitively high pilot densities. The resulting self-noise becomes very significant, and it cannot be overcome by traditional methods of increasing the SNR such as beamforming or increasing the transmit/receive gains. This is a missing piece of the puzzle that various embodiments described herein aim to provide.

There are various causes of channel variations, and these may be exacerbated in mmW. Such channel variations may lead to interpolation errors in the real and imaginary components of the channel. In the case of tightly-spaced modulation constellations such as 64-QAM, even a 10% error in the channel estimate can lead to symbols being incorrectly decoded.

Doppler Shifts:

When there is relative motion between the transmitter and receiver, the frequency of the signal as perceived by the receiver is shifted from the true frequency, leading to apparent channel phase rotations across symbol indices. Since the amount of this Doppler shift is linear in the carrier frequency [see, e.g., Ref. 10], the rate of change of the channel can be an order of magnitude faster in the mmW range (e.g., >28 GHz) relative to conventional cellular or WiFi systems having carrier frequencies below 3 GHz. FIG. 2(a) illustrates the phase for an exemplary line-of-sight wireless channel at (2.4, 60) GHz carrier frequency with Doppler shift caused by a receiver speed of 30 mph. It is apparent from FIG. 2(a) that higher carrier frequencies lead to faster varying channels for moving receivers and/or transmitters.

Bursty Directional Transmissions:

Due to their small wavelength, the omni-directional path loss of mmW signals can be easily 20 to 30 dB higher than conventional cellular transmissions (a consequence of Friis Law [see, e.g., Ref. 10]). As a result, long-range transmissions depend on highly directional beamforming to different users. A consequence of directional transmissions is that, unlike traditional cellular systems where pilot or reference signals can be continuously tracked in both the uplink and downlink, mmW transmissions to any mobile unit will be much more bursty and intermittent. As a result, receivers must re-synchronize each MAC frame, leading to significant residual timing and carrier frequency offsets, as elaborated below:

Timing Offsets:

These offsets can be limited to about 3% of the symbol duration [see, e.g., Ref. 11], but are still sufficient to cause phase rotations in the channel across subcarrier indices. FIG. 2(b) illustrates an exemplary channel that would result from timing offsets of 3 and 7 samples, corresponding to 1.17% and 2.73% of a 256-sample symbol. FIG. 2(b) illustrates the general principle that larger timing offsets lead to more rapid variations in the channel phase across subcarriers.

Residual Frequency Offsets (RFO):

These offsets, which are due to small offsets between the nominal and actual carrier frequencies generated in the transmitter and/or receiver, can be limited to about 1% of the subcarrier bandwidth [12] but still may cause significant variations in the channel across symbol indices. FIG. 2(c) illustrates an exemplary channel response when the channel bandwidth is 20 MHz, the OFDM FFT size is 256, the subcarrier bandwidth is 78.125 kHz, and the RFO is (0.5, 1.0)% of the subcarrier bandwidth. Larger values of RFO lead to more rapid channel variations across symbol indices.

Multipath Estimation on Wide Bandwidths:

One of the main benefits of mmW systems is the possibility of using wide bandwidths. However, use of any spectrum demands an accurate channel estimate across the entire frequency band. The rate of variation of the channel across frequency is proportional to the delay spread, which is the difference in time delay of arrivals between different paths. Measurements described in Ref. [1] have demonstrated that typical delay spreads in mmW range from 200 ns to as high as 1 µs. FIG. 2(d) illustrates the response of a simple two-ray multipath channel with a delay spread of 200 ns, a power difference between rays of 10 dB, channel bandwidths of 20 MHz and 100 MHz, OFDM FFT size of 256, and a cyclic prefix (CP) of 64 samples to eliminate inter-symbol interference (ISI). The exemplary results shown in FIG. 2(d) illustrate that larger channel bandwidths lead to more rapid variations across subcarrier indices. The presence of strongly directional multipath components common in mmW systems (see, e.g., Ref. 13) makes these variations even more rapid.

In summary, the mmW channel can change rapidly across OFDM subcarrier indices due to multipath interference and timing offsets as well as across symbol indices due to RFO and Doppler). These effects are exacerbated in mmW due to the rich multipath diversity, high carrier frequencies, and large channel bandwidths. Interpolation errors increase when the underlying channel exhibits more rapid variances, leading to lower quality channel estimates at the receiver.

As mentioned above, existing channel interpolation techniques are generally inadequate to track and compensate for the channel variations described hereinabove. Five of these existing techniques are briefly described below.

Parametric Estimation:

FIGS. 2(a), 2(b), and 2(c) illustrate exemplary channel variations caused by Doppler shifts and timing/frequency offsets that are, e.g., perfectly sinusoidal. As such, the channel can be reconstructed by estimation of two parameters of a sinusoid: a) amplitude; and b) initial phase. However, sinusoidal reconstruction is not robust in the presence of multipath interference prevalent in mmW multipath channels, which causes non-sinusoidal variations illustrated in the exemplary FIG. 2(d).

Linear Interpolation:

This exemplary technique is robust, as it does not make any prior assumptions about the nature of channel variations (unlike sinusoidal reconstruction). The channel estimate at a data or non-pilot resource element (RE) is derived from the linear interpolant, which is the straight line that connects the channel estimates at the nearest two pilot locations. The real and imaginary components of the channel h are interpolated independently. While linear interpolation is popular for its computational efficiency, its main weakness is large interpolation errors when the interpolant between the two pilot locations spans over a crest or trough in the underlying channel component.

Polynomial Interpolation:

The channel can be reconstructed by estimating the parameters of an $n^{th}$ order polynomial that fits the channel estimates derived from the pilots. Since n is proportional to the OFDM FFT size and the packet size, it can be very large, rendering this technique computationally infeasible for practical mmW systems.

2D Triangulation:

Widely implemented for its computational efficiency and simplicity, 2D triangulation simply calculates the weighted average of the channel estimates derived from the three nearest pilot locations. The real and imaginary components of the channel are independently interpolated. The main weakness of this scheme is large interpolation errors when: a) the pilots used to estimate the channel at an RE span a crest or trough (in 2D space); and b) the channel exhibits variations at different rates across subcarrier and symbol indices.

Decision Directed Feedback Equalization:

In DDFE, the receiver maintains $h_i$, the estimate of the channel on each subcarrier i. The initial values of each $h_i$ are calculated from the packet preamble. When a symbol $r_i$ is received, it is estimated as $$s_i = \frac{r_i}{h_i},$$

and matched to the nearest symbol in the constellation ($\hat{s}_i$). The channel estimate is then updated as $$h_i = \frac{r_i}{s_i},$$

and is used for the next symbol. DDFE works well when channel variations across time are slow, but fails when there is considerable RFO or Doppler. The advantage of DDFE is that if the channel exhibits rapid changes across subcarriers and is time invariant, the channel estimate on every subcarrier is perfect, since the estimates are derived from the preamble rather than being interpolated from the pilots.

Whittaker-Shannon Sinc Interpolation:

According to theory [see, e.g., Refs. 15 and 16], Sinc interpolation is an optimal method to construct a continuous bandlimited function from a set of sampled known real values of that function; the real and imaginary components are therefore interpolated independently. In a 2D grid of subcarriers and symbol indices, the pilot REs are replaced by impulses, scaled by the value of the channel at that RE. The resulting grid of REs is passed through an ideal low-pass filter (which is the equivalent of convolution with a Sinc function) to arrive at the channel estimates at each data (non-pilot) RE. While Sinc interpolation is optimal in a bandlimited sense, the underlying channel variations are not always bandlimited, leading to interpolation errors. Another weakness of Sinc interpolation is the Gibbs phenomenon that leads to large interpolation errors at the edges of the packet (FIG. 1). There are techniques to mitigate the Gibbs phenomenon (such as the Fejér summation [see, e.g., Ref. 17] or wavelet transform [see, e.g., Ref. 18]), but their study is out of the scope of the description provided herein.

Thus, there may be a need to address at least some of the inadequacies, issues, and/or concerns with existing OFDM channel estimate interpolation techniques described herein.

SUMMARY OF EXEMPLARY EMBODIMENTS

Accordingly, to address at least some of such issues and/or problems, certain exemplary embodiments of methods, systems, devices, and computer-readable media of the present disclosure can utilize a simple and accurate procedure to determine channel estimates that are accurate in view of many different channel conditions (e.g., SNR, multipath) and receiver inaccuracies (e.g., RFO). For example, exemplary embodiments of methods, systems, devices, and computer-readable media of the present disclosure can vastly out-perform conventional methods, techniques and systems in various known applications, including exemplary applications discussed herein.

Such embodiments, which may be referred to herein as Vulcan, recognize and utilize the implied physical relationship between the real and imaginary components of the channel to provide clean estimates, even when the underlying channel exhibits rapid variations. Extensive over-the-air experimentation (e.g., at 2.4 and 5.1 GHz) and measurement driven channel emulation (e.g., for mmW frequencies), has demonstrated that Vulcan enables dense modulation constellations (e.g., 64-QAM), reduces the pilot density (e.g., overhead or wasted bandwidth), enables low-SNR operation, and improves the packet success rates by factors ranging from 50% to 10×, depending on the usage scenario.

Millimeter wave (mmW) frequencies of above 28 GHz are widely believed to be the future of wireless and cellular networks because of the amount of spectrum available in these bands. However, OFDM links at these frequencies are notoriously fragile due to rich multipath diversity, Doppler effects, and hardware imperfections that cause rapid channel variations across subcarrier and symbol indices. Pilot symbols can be used to track and compensate for these variations, although interpolation errors in resulting channel estimates become very significant under rapid variations such as those observed in mmW. Vulcan channel interpolation can provide clean channel estimates in the face of rapid channel variations. Vulcan is a very simple technique that leverages the implied relationship between the real and imaginary components of the channel. A combination of over-the-air experiments (e.g., 2.4 and 5.1 GHz) and measurement-driven channel models (mmW) shows that Vulcan improves packet success rate by as much as 10×

In certain exemplary embodiments of the present disclosure, it is possible to provide a computer-implemented method for estimating the response of a communication channel. For example, with such method, it is possible to receive, via the communication channel, a signal comprising a plurality of symbols, each symbol comprising a plurality of sub-carriers; for each of one or more pilot sub-carriers, determine a pilot sub-carrier response and a pilot sub-carrier metric; and for each of one or more non-pilot sub-carriers: determine a non-pilot sub-carrier metric, and if the non-pilot sub-carrier metric satisfies a predetermined criterion, determine a particular component of a non-pilot sub-carrier response as a function of components, different from the particular component, of one or more pilot sub-carrier responses. Furthermore, for each of the one or more non-pilot sub-carriers, if the non-pilot sub-carrier metric does not satisfy the predetermined criterion, it is possible to determine the particular component of the non-pilot sub-carrier response as a function of the particular component of one or more pilot sub-carrier responses.

In some exemplary embodiments, the particular component can be a real component, while in other embodiments the particular component can be an imaginary component. In some exemplary embodiments, it is possible to determine the pilot sub-carrier response, the pilot sub-carrier metric, and the non-pilot sub-carrier metric in a particular dimension and a further dimension. In some exemplary embodiments, the particular dimension is one of a sub-carrier dimension and a symbol dimension, and the further dimension is a different one of a sub-carrier dimension and a symbol dimension. According to further exemplary embodiments of the present disclosure, it is also possible to provide communication apparatus and computer-readable media embodying one or more of the exemplary computer-implemented methods and/or procedures.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments, in which:

FIGS. 5(a)-5(c) are exemplary charts providing a comparison of packet success rates under various channel phenomena between various prior art interpolation methods and Vulcan interpolation according to one or more exemplary embodiments of the present disclosure;

Figure 1:
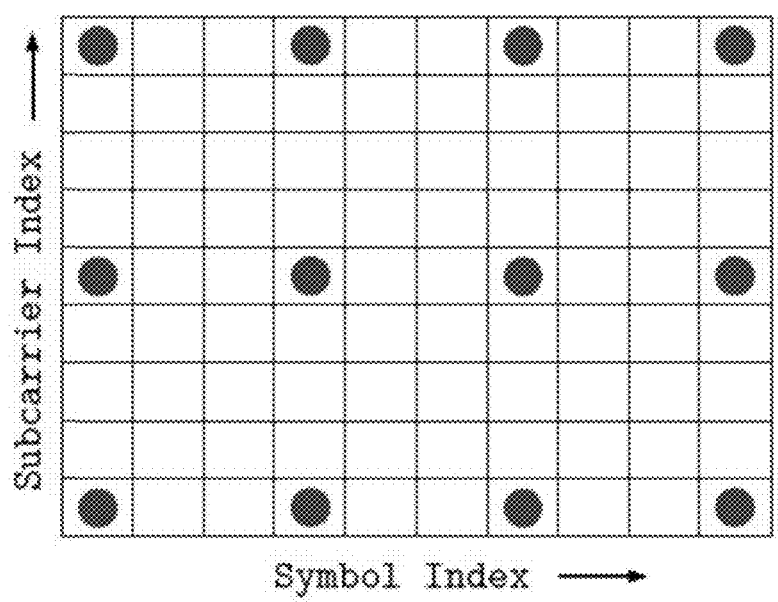
FIG. 1 is an exemplary OFDM packet comprising a grid of resource elements (REs) including exemplary pilot-symbol locations.

While the present disclosure will now be described in detail with reference to the figures, it is done so in connection with the illustrative embodiments and is not limited by the particular embodiments illustrated in the figure(s) or in the appended claims.

DETAILED DESCRIPTION OF EXEMPLARY EMBODIMENTS

Various exemplary embodiments of the Vulcan interpolation technique of the present disclosure can have the ability to minimize the pilot density, while making no prior assumptions on how the channel varies over subcarrier and symbol indices. Moreover, various embodiments of the Vulcan interpolation technique of the present disclosure can accomplish these goals while remaining computationally efficient.

Embodiments of Vulcan interpolation may exploit the fact that channels in the mmW range will typically have a sparse sinusoidal structure. In OFDM, the channel can be represented as a two-dimensional array of complex gains. Let $h_{(n,t)}$ denote the complex channel gain on subcarrier index n and symbol index t. In a multipath model, the channel is given by [18]:

$$h_{(n,t)} = \frac{1}{\sqrt{L}} \sum_{\ell=1}^{L} g_\ell e^{2\pi i n \tau_\ell + t f_d \cos(\theta_\ell)}$$

where L is the number of sub-paths in the channel and for each sub-path l, g is the path gain, τ is the path delay (relative to the subcarrier spacing); θ is the path phase relative to direction of motion; and $f_d$ is the maximum Doppler shift. Channel estimation can be seen as the process of observing the channel at some subset of points (n, t) where reference signals (pilots) are sent, and then interpolating the channel to other points to demodulate the data.

In traditional channel models (such as the classic Jakes' model), the signal is assumed to arrive from a very large number of paths with a continuous angular and delay spread. This can result in a channel that becomes approximately Gaussian and optimal estimation in these scenarios is linear. However, channels in the mmW region tend to have a much more sparse structure. Since mmW signals are transmitted on very narrow beams and propagate through a limited number paths concentrated in small numbers angular and delay clusters [1, 19]. This channel is not Gaussian, and non-linear estimators can therefore offer significant gains.

The real and imaginary components of the channel at subcarrier index i and symbol index j bear a very close relationship with each other (and the magnitude of the channel) as shown:

$$Abs\{h_{(i,j)}\} = \sqrt{(Re\{h_{(i,j)}\})^2 + (Im\{h_{(i,j)}\})^2}$$

Figure 3:
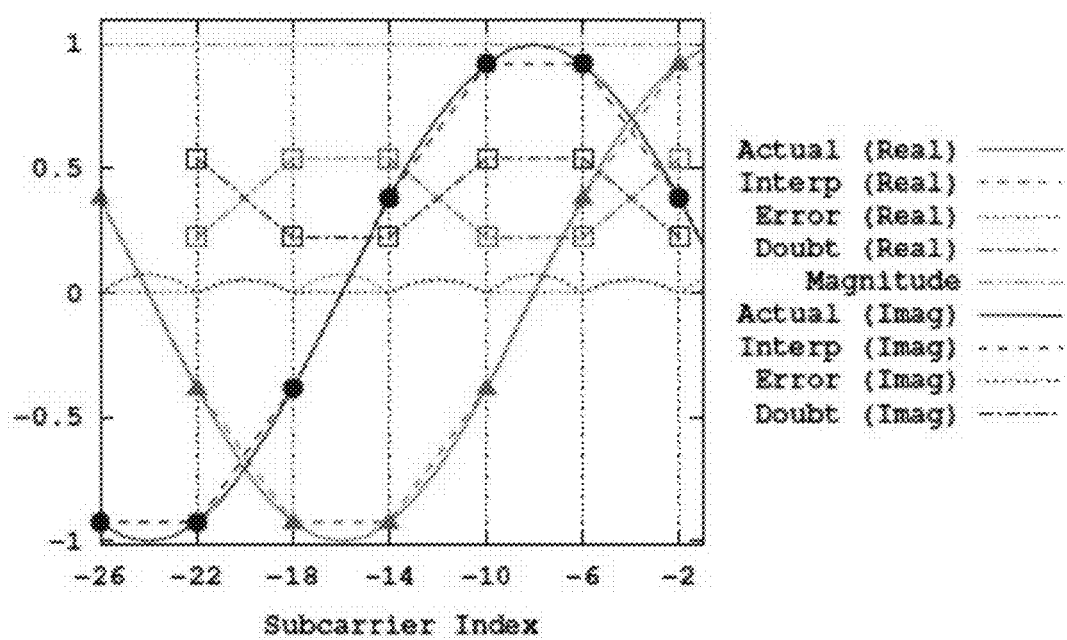
FIG. 3 is an exemplary graph of exemplary variations in an exemplary mmW OFDM channel across subcarriers −26 to −1 caused by a timing offset of two samples (e.g., 3.125% of the symbol duration), as well as channel estimates derived using linear interpolation.

Unlike traditional interpolation techniques that ignore this relationship, according to the exemplary embodiments of the present disclosure, these components are not treated independently; in fact, this relationship forms the heart of Vulcan. To explore the relationship between the real and imaginary components further, consider an exemplary OFDM system with FFT size 64 having an offset in symbol boundary estimation at the receiver of 2 samples, corresponding to $$\frac{2}{64} = 3.125\%$$

of the symbol duration. In this exemplary system, subcarriers (−32, −27), 0, and (27, 31) are not used and the pilot symbols are spaced every fourth RE on subcarriers −26, −22, etc. FIG. 3 shows the actual response of this exemplary channel for subcarriers (−26, −1), along with the estimated channel response using linear interpolation (real and imaginary components are independently interpolated) between pilot symbols.

At least the following observations can be made from FIG. 3. First, the magnitude of the channel is very slow varying. While magnitude invariance holds true in this example (timing offset of two samples), it does not hold true in the presence of effects such as multipath interference. However, as described in more detail herein below, the variations in channel magnitude are generally slower than those exhibited by the real and imaginary components.

Second, the interpolation errors are the greatest when the underlying channel component is in a crest or trough. Third, when the real component has large interpolation errors, the imaginary component has low errors (and vice versa). For example, examine the channel between subcarriers −10 to −6. The imaginary component of the channel is in a crest, and exhibits high interpolation errors; meanwhile, the real component of the channel is less curvy, leading to lower interpolation errors.

Based on the above observations, according to exemplary embodiments of the present disclosure, it is possible to employ the exemplary technique of avoiding linear interpolation when the underlying channel component is either in a crest or trough, thereby reducing interpolation errors. Exemplary embodiments utilizing one-dimensional (1D) interpolation are described first, and later extend it to the two-dimensional (2D) case. FIG. 1 illustrates an exemplary OFDM packet as a two-dimensional grid of resource elements (REs), each of which comprises a range of subcarriers (frequency) during a symbol period (time). Sample pilot locations in the pattern are marked dots. As used herein, "1D interpolation" refers to either: a) interpolating the channel across subcarriers for a fixed symbol index (e.g., "vertical" interpolation with respect to FIG. 1); or b) interpolate the channel across symbol indices for a fixed subcarrier index (e.g., "horizontal" interpolation with respect to FIG. 1). For the purposes of illustration, embodiments will be described based on vertical interpolation for estimating the real component of the channel on all subcarriers for fixed symbol index j. Nevertheless, a person of ordinary skill will recognize that this is merely exemplary and may be easily extended to horizontal interpolation and interpolation of imaginary components.

Native/Reconstructed Interpolation:

As indicated herein, exemplary embodiments of the present disclosure can utilize an exemplary technique that if the real component of the channel at subcarrier i is neither in a crest nor a trough (e.g., between subcarriers −10 and −6 in FIG. 3), simply perform linear interpolation from the real component of channel estimates derived from the nearest neighboring pilots (so-called "native interpolation"); and b) if the real component of the channel on subcarrier i is either in a crest or in a trough (e.g., between subcarriers −18 and −14 in FIG. 3), reconstruct it from the estimated imaginary and absolute components according to:

$$Re\{h_{(i,j)}\} = \sqrt{(Abs\{h_{(i,j)}\})^2 - (Im\{h_{(i,j)}\})^2}$$

where + or − polarities are chosen as appropriate, and $Abs\{h_{(i,j)}\}$ and $Im\{h_{(i,j)}\}$ are determined using linear interpolation from the channel estimates derived from the nearest neighboring pilots.

The locations of the crests and troughs in the real component of the channel must be identified as a predicate to using the above-described two-prong exemplary technique. In some exemplary embodiments, crest/trough detection is done by estimating the rate of slope change (so-called "doubt") in the underlying channel using second differences.

Doubt at Pilot Locations:

The real question in the vertical direction at a pilot RE can be defined as the rate of slope change in the real component of the channel, centered around that pilot location. Using the example plotted in FIG. 3, the real vertical doubt $d_{(vert)(i,j)(im)}$ at subcarrier −10 is $d_{(vert)(-10,j)(re)} = Re\{|(h_{(-6,j)} - h_{(-10,j)}) - (h_{(-10,j)} - h_{(-14,j)})|\}$, based on the fact that the nearest pilots are located at sub-carriers −14 and −6. The real vertical doubt at subcarrier −26 is undefined because there are no pilots on subcarrier indices less than −26. Note that $d_{(vert)(i,j)(re)}$ captures the amount of inflection in the real component of the channel at pilot location (i, j) as measured in the vertical direction across subcarriers. Note that $d_{(vert)(i,j)(im)}$ and $d_{(vert)(i,j)(abs)}$ are analogously defined on the imaginary and absolute components of the channel.

Doubt at Data (Non-Pilot) Locations:

For fixed symbol index j, the real doubt of all data (non-pilot) REs at subcarrier index i may be defined as the weighted average of the real doubts of the two nearest pilot locations on symbol index j. The average is weighted by the Euclidean distance from the data RE (i, j) to the pilots. In other words, for fixed symbol index j, $d_{(vert)(i,j)(comp)}$, for comp $\in$ {re, im, abs} is calculated for all subcarriers i. The values of real and imaginary doubt for all non-pilot REs are also shown in FIG. 3. Note that the doubt correlates with interpolation errors resulting from native linear interpolation, e.g., both the real doubt and the interpolation errors between subcarriers −18 and −14 are high, and both the real doubt and the interpolation errors between subcarriers −10 and −6 are low.

Choice Between Native and Reconstructed Interpolation:

Given for a fixed symbol index j and all subcarriers i, the doubt values $d_{(vert)(i,j)(re)}$, $d_{(vert)(i,j)(im)}$, and $d_{(vert)(i,j)(abs)}$ determined as described above, the decision between performing native or reconstructed interpolation is determined based on the following exemplary cases.

Case 1: $d_{(vert)(i,j)(re)} \leq d_{(vert)(i,j)(im)}$: In this exemplary case, a native interpolation can be used to calculate the real component of the channel Re{$h_{(i,j)}$}. This is because the real component of the channel at that RE is at less of an inflection as compared to the imaginary component. As such, there is a higher level of confidence for performing native interpolation on the real component.

As shown in the exemplary case of the graph of FIG. 3, native interpolation is performed on the real component of the channel between subcarriers −10 and −6.

Case 2: $d_{(vert)(i,j)(im)} < d_{(vert)(i,j)(re)}$: This case comprises a necessary, although not sufficient, condition to reconstruct the real component from the imaginary and absolute components. If the absolute component happens to be at a high inflection at this location, however, there is less confidence in the reconstruction. Therefore, if $d_{(vert)(i,j)(im)} + d_{(vert)(i,j)(abs)} < d_{(vert)(i,j)(re)}$, the real component is reconstructed from the imaginary and absolute components. Otherwise, native interpolation is used to determine the real component. Note that if the doubt at a location is undefined, native interpolation is also used. As shown in the exemplary case of the graph of FIG. 3, reconstructed interpolation is performed on the real component of the channel between subcarriers −18 and −14.

Figure 10:
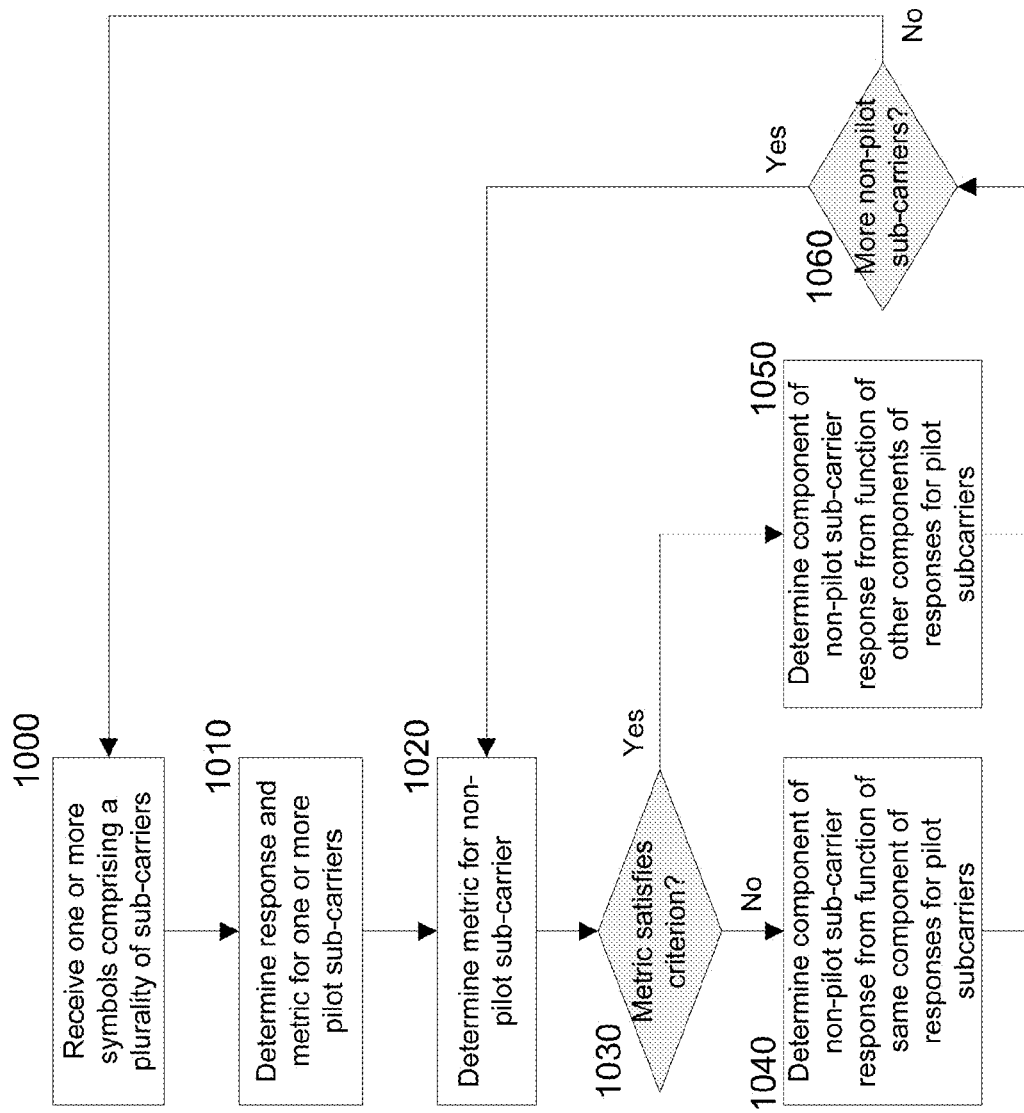
FIG. 10 is a flow diagram of an exemplary method for estimating, in a single dimension, a frequency response of a communication channel represented by a plurality of sub-carriers according to one or more exemplary embodiments of the present disclosure.

FIG. 10 shows an exemplary flow diagram of an exemplary method estimating, in a single dimension, a frequency response of a communication channel represented by a plurality of sub-carriers according to one or more exemplary embodiments of the present disclosure. Although the exemplary method is illustrated in FIG. 10 by blocks in the particular order shown in FIG. 10, this order is merely exemplary, and the functions corresponding to the blocks may be performed in different orders and can be combined and/or divided into blocks having different functionality than shown in FIG. 10.

Turning to FIG. 10, initially the exemplary procedure proceeds to block 1000, where one or more symbols comprising a plurality of sub-carriers are received (e.g., by a communications receiver/transmitter). In some exemplary embodiments, a portion of the symbols may include one or more pilot sub-carriers, such as shown in FIG. 1. In block 1010, a response and a metric in a particular dimension can be determined for each of one or more pilot sub-carriers comprising the received symbols, e.g., using a computer processor. In some exemplary embodiments, the particular dimension may be the sub-carrier dimension, while in other embodiments, the particular dimension may be the symbol dimension. In some exemplary embodiments, the metric can represent a rate of slope change of the pilot sub-carrier response proximate to the pilot sub-carrier in the particular dimension, such as the doubt function described above. Subsequently, procedures of blocks 1020 through 1060 can be repeated (e.g., using the computer processor) for each of one or more non-pilot sub-carriers (e.g., data sub-carriers) comprising the one or more received symbols.

In block 1020, a metric in a particular dimension can be determined for a non-pilot sub-carrier (e.g., using the computer processor). In some exemplary embodiments, the non-pilot sub-carrier metric may be the doubt function described above and, for example, can be computed according to a weighted average of pilot sub-carrier metrics corresponding to one or more pilot sub-carriers proximate to the non-pilot sub-carrier in the particular dimension. In block 1030, a determination is made (e.g., using the computer processor) whether the metric computed in block 1020 satisfies a particular criterion. In some exemplary embodiments, the criterion can be predetermined, and/or can comprise a particular component of the non-pilot sub-carrier metric being less than a function of a plurality of other components of the non-pilot sub-carrier metric. In some exemplary embodiments, the particular component can be a real component and the other components may comprise imaginary and absolute value components. In some exemplary embodiments, the particular component can be an imaginary component and the other components may comprise real and absolute value components. In some exemplary embodiments, the function of the plurality of other components of the non-pilot sub-carrier metric can be a weighted or non-weighted sum of the other components.

If the metric does not satisfy the criterion, then in block 1030, the particular component (e.g., real or imaginary component) of the non-pilot sub-carrier response can be determined from a function of same component of responses for pilot subcarriers (e.g., using the computer processor). For example, the particular component can be determined using conventional interpolation of the same component of the pilot sub-carrier responses. The method then proceeds to block 1050. Otherwise, if the metric satisfies the criterion, then in block 1040, the particular component (e.g., real or imaginary component) of the non-pilot sub-carrier response can determined from a function of other components of responses for pilot sub-carriers (e.g., using the computer processor). In some exemplary embodiments, the function of other components of responses for pilot sub-carriers can be a non-linear function, e.g., the square root of the sum or difference of the squares of the other components. The method/procedure then proceeds to block 1050.

In block 1050, a determination can be made whether other non-pilot sub-carriers remain (e.g., using the computer processor). If so, the method/procedure returns to block 1010. Otherwise, the method/procedure returns to block 1000 to await reception of other symbols comprising plurality of sub-carriers. Although not shown, the method/procedure can stop if no other symbols are received after some duration, or upon command by a user, a transmitting unit, or other entity (e.g., controller).

Figure 4:
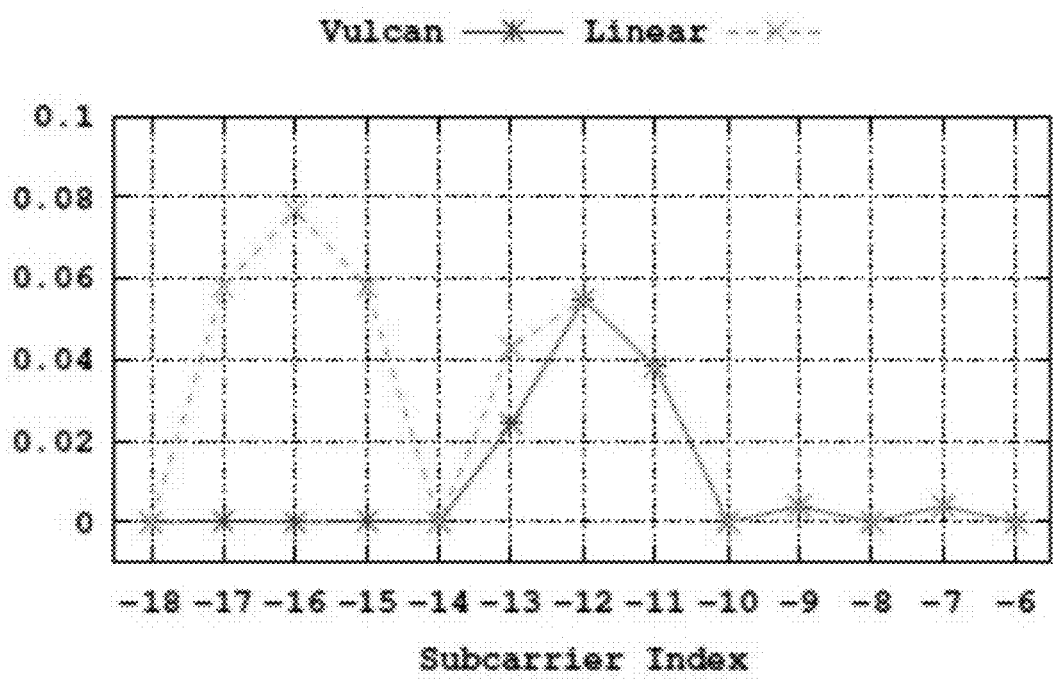
FIG. 4 is an exemplary graph of a comparison of interpolation errors on the real component of an estimate of an exemplary mmW OFDM channel on subcarriers −18 to −6 between linear interpolation and Vulcan interpolation according to one or more exemplary embodiments of the present disclosure.

Gains of Reconstruction:

Based on the interpolation choices described above for the exemplary channel conditions shown in FIG. 3, the graph in FIG. 4 illustrates a graph of exemplary performance improvements for embodiments of the Vulcan interpolation technique of the present disclosure for the real component of the channel between subcarriers −18 and −6. These exemplary embodiments perform reconstructed interpolation on subcarrier indices (−17, −16, −15, −13), while defaulting to native (linear) interpolation on the others. The exemplary results shown in the graph of FIG. 4 show that embodiments of the Vulcan technique demonstrate significantly less error than pure linear interpolation, particularly over the trough that lies between subcarriers −18 and −14.

According to other exemplary embodiments, these techniques can be further extended to 2D interpolation in order to estimate the channel for all REs in a packet. In these embodiments, Vulcan uses a three step process to estimate the channel at all the non-pilot REs:

1. For each symbol index that contains pilots, perform 1D vertical interpolation to estimate the real and imaginary components of the channel on all subcarriers.
2. For each subcarrier that contains pilots, perform 1D horizontal interpolation to estimate the real and imaginary component of channel on all symbol indices.
3. Estimate the channel on all remaining REs by the procedure described in the exemplary Procedure.

With reference to the exemplary RE grid shown in FIG. 1, step 1 estimates the channel on all vertical lines that connect the pilot locations, while step 2 estimates the channel on all horizontal lines that connect the pilot locations. The rectangular areas remaining are estimated in step 3 using the exemplary Procedure described herein below. For each of these remaining REs, Vulcan has four choices in how to use 1D interpolation to estimate each component of the channel: a) native, horizontal; b) native, vertical; c) reconstructed, horizontal; and d) reconstructed, vertical. The main issue is choosing which one of these approaches to use. Vulcan chooses that method for which it is the most confident; in other words, one with the least doubt, or the least inflection. Exemplary Procedure/Algorithm:

---

Estimate the channel at a non-pilot RE (sub-carrier n, symbol index t)

--- for dir ∈ {horizontal, vertical} do
   for comp ∈ {re, im, abs} do
      Calculate $d_{(dir)(n,t)(comp)}$
   end for
end for

---

Calculate Re$\{h_{(n,t)}\}$ using 1D Interpolation as follows:

---

$d_0 = d_{(hori)(n,t)(re)}$
$d_1 = d_{(vert)(n,t)(re)}$
$d_2 = d_{(hori)(n,t)(im)} + d_{(hori)(n,t)(abs)}$
$d_3 = d_{(vert)(n,t)(im)} + d_{(vert)(n,t)(abs)}$
$d_{min} = \min(d_0, d_1, d_2, d_3)$
if $d_{min} = d_0$ then
   Interpolation: Native, Horizontal
else if $d_{min} = d_1$ then
   Interpolation: Native, Vertical
else if $d_{min} = d_2$ then
   Interpolation: Reconstructed, Horizontal
else
   Interpolation: Reconstructed, Vertical
end if
Calculate Im$\{h_{(n,t)}\}$ using 1D Interpolation in the same manner as Re$\{h_{(n,t)}\}$, but with (re), (im) components reversed.

---

Figure 11:
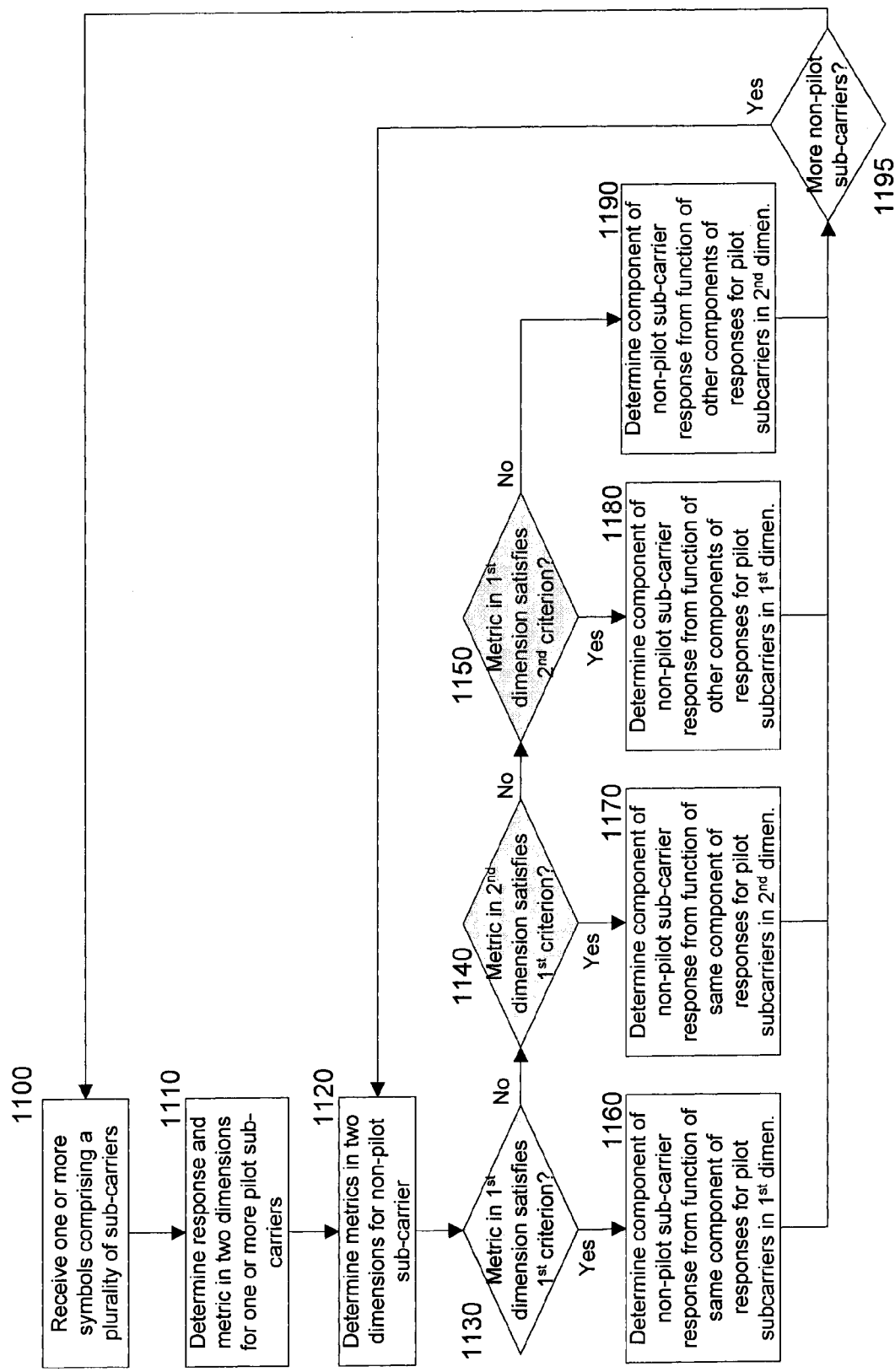
FIG. 11 is a flow diagram of an exemplary method for estimating, in two dimensions, a frequency response of a communication channel represented by a plurality of sub-carriers according to one or more exemplary embodiments of the present disclosure.

FIG. 11 shows an exemplary flow diagram of an exemplary method/procedure for estimating, in two dimensions, a frequency response of a communication channel represented by a plurality of sub-carriers according to one or more exemplary embodiment of the present disclosure. Although the exemplary method is illustrated in FIG. 11 by blocks in the particular order shown in FIG. 11, this order is merely exemplary and the functions corresponding to the blocks may be performed in different orders and may be combined and/or divided into blocks having different functionality than shown in FIG. 11.

Turning to FIG. 11, the exemplary method/procedure proceeds initially to block 1100, where one or more symbols comprising a plurality of sub-carriers are received. In some exemplary embodiments, a portion of the symbols may include one or more pilot sub-carriers, such as shown in FIG. 1. In block 1110, a response and metrics in two dimensions can be determined (e.g., using the computer processor) for each of one or more pilot sub-carriers comprising the received symbols. In some exemplary embodiments, the two dimensions can be the sub-carrier and symbol dimensions. In some exemplary embodiments, the metric can represent a rate of slope change of the pilot sub-carrier response proximate to the pilot sub-carrier in a particular dimension, such as the doubt function described above. Subsequently, the performance of blocks 1120 through 1195 can be repeated (e.g., using the computer processor) for each of one or more non-pilot sub-carriers (e.g., data sub-carriers) comprising the one or more received symbols.

In block 1120, metrics in two dimensions can be determined for a non-pilot sub-carrier (e.g., using the computer processor). In some exemplary embodiments, the non-pilot sub-carrier metric in a particular dimension can be the doubt function described herein and, for example, can be computed (e.g., using the computer processor) according to a weighted average of pilot sub-carrier metrics corresponding to one or more pilot sub-carriers proximate to the non-pilot sub-carrier in the particular dimension. In block 1130, a determination can be made (e.g., using the computer processor) whether the metric in a first dimension, computed in block 1120, satisfies a first criterion. In some exemplary embodiments, the first criterion can be predetermined (e.g., using the computer processor). In some exemplary embodiments, the first criterion can comprise a particular component of the non-pilot sub-carrier metric being less than all of: a function of a plurality of other components of the non-pilot sub-carrier metric in the same dimension, the particular component of the non-pilot sub-carrier metric in the other dimension, and the function of the plurality of other components of the non-pilot sub-carrier metric in the other dimension. In some exemplary embodiments, the particular component can be a real component and the other components may comprise imaginary and absolute value components. In some exemplary embodiments, the particular component can be an imaginary component and the other components can comprise real and absolute value components. In some exemplary embodiments, the function of the plurality of other components of the non-pilot sub-carrier metric can be a weighted or non-weighted sum of the other components.

If the metric in the first dimension satisfies the first criterion, the method/procedure can proceed to block 1160, where the particular component of non-pilot sub-carrier response can be determined from a function of same component of responses (e.g., using the computer processor) for pilot sub-carriers in the first dimension. For example, the particular component can be determined using conventional interpolation of the particular component of the pilot sub-carrier responses in the first dimension (e.g., using the computer processor). The method/procedure proceeds to block 1195.

On the other hand, if the non-pilot sub-carrier metric in the first dimension does not satisfy the first criterion, then the method/procedure can proceed to block 1140, where a determination can be made whether the non-pilot sub-carrier metric in a second dimension, computed in block 1120, satisfies the first criterion (e.g., using the computer processor). If the metric in the second dimension satisfies the first criterion, the method/procedure proceeds to block 1170, where the particular component of the non-pilot sub-carrier response can be determined from a function of same component of responses for pilot subcarriers in the second dimension (e.g., using the computer processor). For example, the particular component of the non-pilot sub-carrier response can be determined using conventional interpolation of the particular component of the pilot sub-carrier responses in the second dimension. The method/procedure then proceeds to block 1195.

On the other hand, if the non-pilot sub-carrier metric in the second dimension does not satisfy the first criterion, then the method/procedure proceeds to block 1150, where a determination is made (e.g., using the computer processor) whether the non-pilot sub-carrier metric in a first dimension, computed in block 1120, satisfies a second criterion. In some exemplary embodiments, the second criterion can be predetermined. In some exemplary embodiments, the second criterion can comprise a function of a plurality of other components (e.g., other than the particular component) of the non-pilot sub-carrier metric in a particular dimension (e.g., the first dimension) being less than all of: the particular component of the non-pilot sub-carrier metric in the same dimension, the particular component of the non-pilot sub-carrier metric in the other dimension, and the function of the plurality of other components of the non-pilot sub-carrier metric in the other dimension. In some exemplary embodiments, the particular component can be a real component and the other components can comprise imaginary and absolute value components. In some exemplary embodiments, the particular component can be an imaginary component and the other components may comprise real and absolute value components. In some exemplary embodiments, the function of the plurality of other components of the non-pilot sub-carrier metric can be a weighted or non-weighted sum of the other components.

If the non-pilot sub-carrier metric in a first dimension, satisfies a second criterion, then the method/procedure proceeds to block 1180, where the particular component (e.g., real or imaginary component) of the non-pilot sub-carrier response can be determined from a function of other components (e.g., other than the particular component) of responses for pilot subcarriers in the first dimension (e.g., using the computer processor). In some exemplary embodiments, the function of other components of responses for pilot subcarriers can be a non-linear function, e.g., the square root of the sum or difference of the squares of the other components. The method/procedure then proceeds to block 1195. Otherwise, if the non-pilot sub-carrier metric in the first dimension does not satisfy the second criterion, the method/procedure proceeds to block 1190, where the particular component (e.g., real or imaginary component) of the non-pilot sub-carrier response can be determined from a function of other components of responses for pilot sub-carriers in the second dimension (e.g., using the computer processor).

In block 1195, a determination can be made (e.g., using the computer processor) whether other non-pilot sub-carriers remain. If so, the method/procedure returns to block 1110. Otherwise, the method returns to block 1100 to await reception of other symbols comprising plurality of sub-carriers. Although not shown, the exemplary method/procedure can be stopped if no other symbols are received after some duration, or upon command by a user, a transmitting unit, or other entity (e.g., controller).

Exemplary embodiments of Vulcan according to the present disclosure can be based on GNU Radio 3.7.2, and operate on USRP N210 software defined radios and XCVR2450 daughter boards, both manufactured by Ettus Research. GNU Radio includes a decision directed feedback equalizer (DDFE). Exemplary embodiments may include GNU Radio code to allow for 2D interpolation and include, in addition to Vulcan interpolation, one or more of the following techniques: a) 2D Triangulation, and b) Whittaker-Shannon Sinc interpolation. Moreover, exemplary embodiments may include various other exemplary enhancements to one or more GNU Radio blocks including, but not limited to, the Schmidl-Cox detector, header payload de-multiplexer, OFDM carrier allocator, bit re-packers, and channel emulation models. Exemplary embodiments can further include the finite state machine (FSM) files for a 3/4-rate convolutional code, as well as a 5/6-rate punctured convolutional code.

The packet success rate performance of embodiments of Vulcan according to the present disclosure can be compared against the following three existing interpolation and/or equalization methods: a) DDFE ($\alpha=0.1$) [19], b) 2D Triangulation, and c) Whittaker-Shannon Sinc Interpolation. The performance of these interpolation techniques is evaluated in the presence of a combination of channel and hardware impairments including: a) multipath diversity; b) timing offsets; c) residual frequency offset; d) Doppler shifts; and e) additive channel noise. The performance comparison can be performed using sophisticated channel models, which have been parameterized from real-world measurement data.

Each of the packet success rates presented are the averages over a 4-minute experimental run. All receivers (e.g., one for each equalization technique) operate in parallel on the same incoming time-domain samples. Unless specified otherwise, all systems are use the following parameters: rate-5/6 punctured convolutional code with eight states, a soft-decision Viterbi decoder, 64-QAM modulation for each RE, 20-MHz channel bandwidth and FFT size of 256 (e.g., leading to a subcarrier width of 78.125 kHz), cyclic prefix of 64 samples. All packets are 1446 bytes prior to coding, corresponding to 12 post-coded time-domain symbols.

Figure 9:
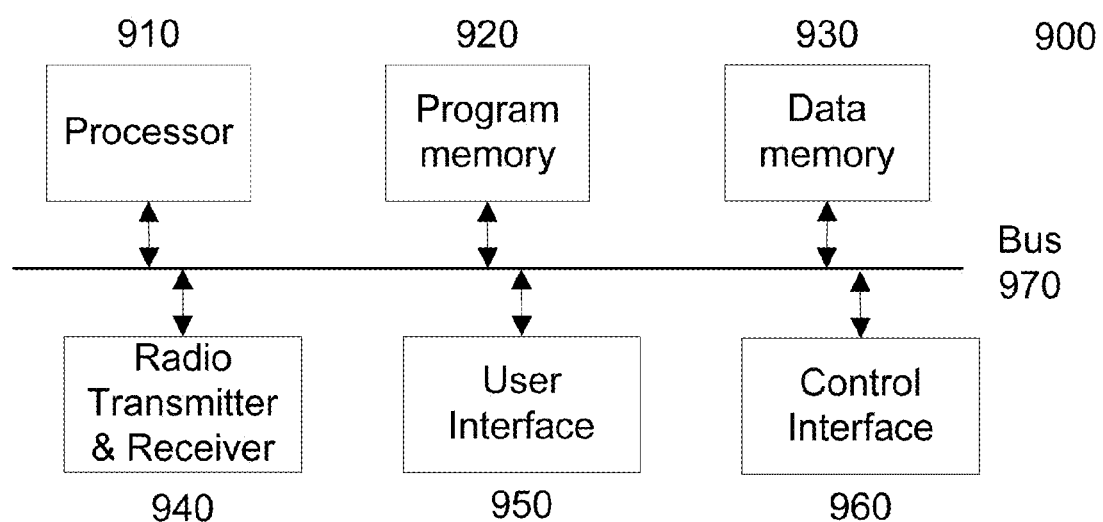
FIG. 9 is a block diagram of an exemplary communication device and/or apparatus according to one or more exemplary embodiments of the present disclosure.

It is noted that exemplary methods/procedures shown in FIGS. 10 and 11 can be executed by the exemplary system/arrangement shown in, e.g., FIG. 9, as well as by specifically provided software which can configure a computer system or computer arrangement to execute specific instructions and procedures described herein.

Multipath Profile Model:

The first parameter that characterizes a multipath profile is the maximum delay spread of the channel ("max"), measured in ns. The baseband sampling rate provides a lower bound on the multipath time resolution. The channel bandwidth of 20 MHz leads to a multipath resolution of no lower than 50 ns. The maximum delay spread, max, can thus be decomposed into N bins, each 50 ns wide. The second parameter that characterizes the multipath profile is n, which is the number of bins that actually receive a multipath component ($n \leq N$).

Measurement data in 28 GHz by Rappaport et al., [9, 20, 21] leads to a few observations. First, non-line-of-sight (NLOS) links vastly outnumber line of sight (LOS) links. Second, while max in NLOS links can be as large as 1400 ns, the typical values of max are generally in the 250 to 750 ns range. Third, the ratio $\frac{n}{N}$ representing the fraction of bins occupied by the multipath profile, typically varies from 50→100%; larger values of $\frac{n}{N}$ indicate more severe multipath interference. Finally, the path loss exponent (PLE) for NLOS links ranges from 3 to 8, with a mean of 5.76.

The GNU Radio multipath channel model used in this evaluation was modified to be dynamic and parameterized. Given max and n, it creates a new multipath profile for each packet using the following steps/procedures:
  a) Decompose max into N bins, each 50 ns wide;
  b) Randomly pick n out of the N bins to use in a particular instance;
  c) Each of the n used bins has an implied path length.

Randomly pick the PLE in the range of 3→8, and calculate the path loss. In this manner, a finite impulse response (FIR) filter is created with n out of N taps having non-zero values. The CP length of 64 samples eliminate inter-symbol interference (ISI). By averaging over an experimental run of 4 minutes, it is possible to simulate a very large number of measurement driven multipath profiles, and study the packet success rates.

Packet Success Rates:

FIG. 5(a) illustrates packet success rates in multipath interference for different combinations of (n, max), where n is the number of used bins (each 50 ns) within a maximum delay spread of max ns. For (n, max)=(10, 500 ns), exemplary embodiments of Vulcan can provide gains of 50% and 2× over 2D Triangulation when $\frac{n}{N}$ is 0.5 and 1, respectively. The corresponding gains over sinc interpolation are 7.8× and 8.5×. When max is increased to 750 ns, the gains over 2D Triangulation are 2.4× and 4.8× when $\frac{n}{N}$ is 0.5 and 1 respectively. The corresponding gains over Sinc interpolation are 6.6× and 5.7×. These results show that while exemplary embodiments of Vulcan performs consistently better than competing schemes, these gains are more pronounced in the high multipath regions. If max is increased to 1000 ns, the gains over 2D Triangulation are even higher at 14×.

Figures 2A, 2B, 2C, 2D:
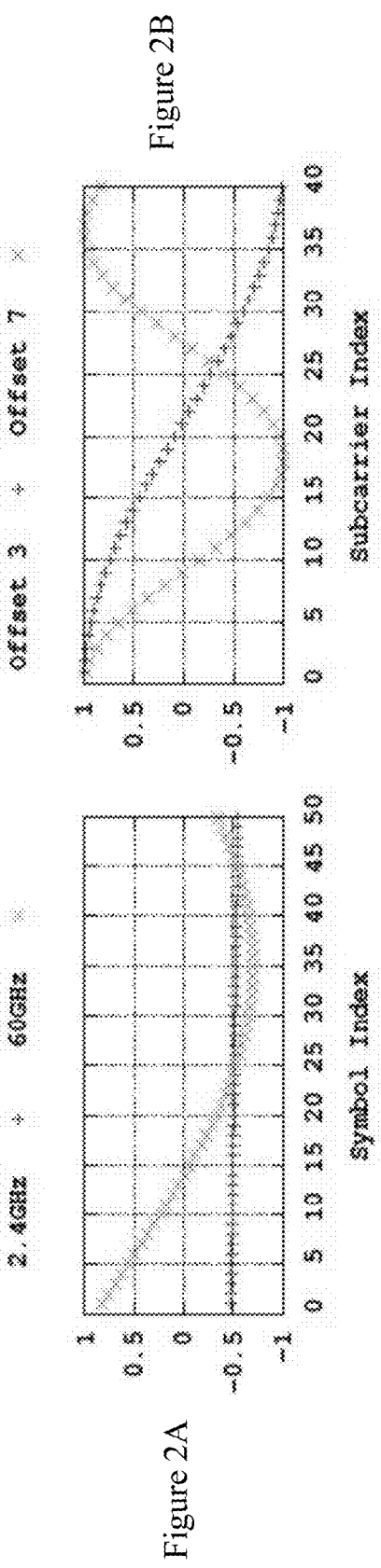
FIGS. 2(a)-2(d) are exemplary graphs of various exemplary variations in an exemplary mmW OFDM channel estimate caused by various phenomena.
Figure 6B:
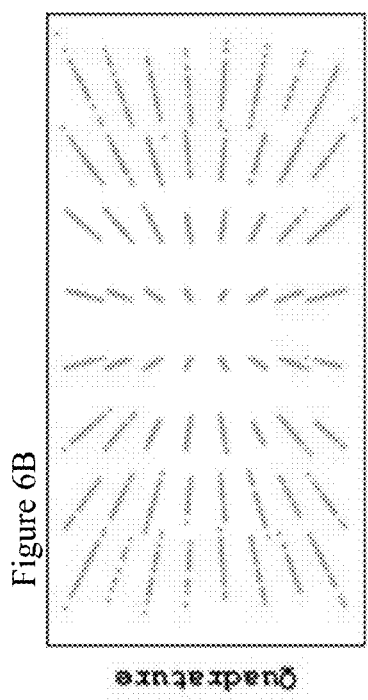
FIGS. 6(a)-6(d) are illustrations of a comparison of an equalized 64-QAM constellation for different channel phenomena between various prior art interpolation methods and Vulcan interpolation according to one or more embodiments of the present disclosure.
Figure 6D:
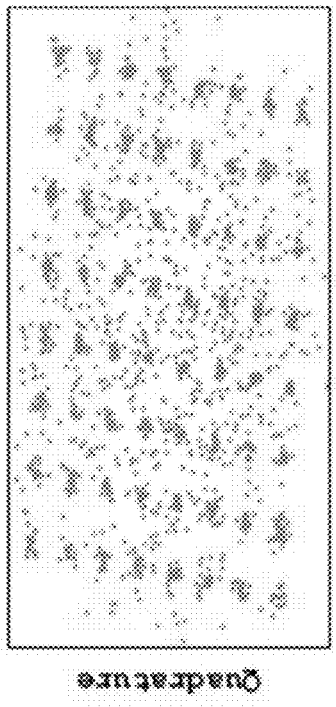
Figure 6A:
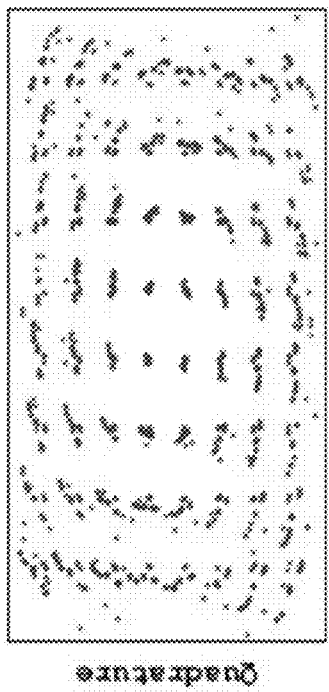
Figure 6C:
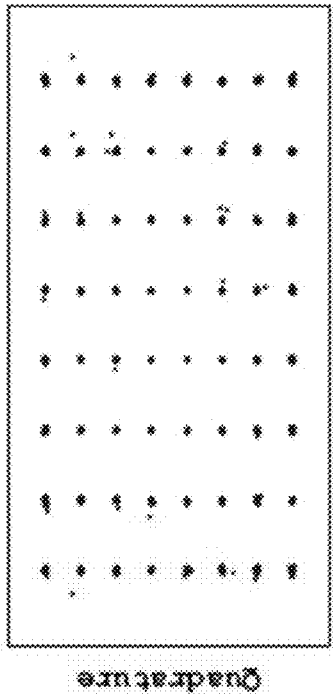

Discussion:

To further illustrate the weaknesses of 2D triangulation and sinc interpolation, respectively, FIG. 6(a) and FIG. 6(b) shows equalized 64-QAM symbols for a random multipath. As shown in an exemplary illustration of FIG. 6(a), 2D triangulation suffers from a rotation in equalized symbols, caused by incorrect channel estimates. As shown in the exemplary illustration of FIG. 6(b), Sinc interpolation is affected by the Gibbs phenomenon, which is exacerbated by the fact that the channel is invariant across symbol indices. Under multi-path diversity, the channel magnitude exhibits slower variations as opposed to the real and imaginary components. Exemplary embodiments of Vulcan are able to utilize this property to perform reconstructed interpolation over 10 to 30% of the REs, leading to cleaner channel estimates as shown in the equalized constellation symbols plotted in FIG. 6(c). Since multipath interference leads to channel invariance across time, DDFE always has perfect channel state information (CSI) as calculated from the packet preamble; the performance of DDFE has therefore not been plotted.

Timing Offset Model:

The time-domain complex baseband samples from the transmitter are fed directly through to the receiver. This emulates a perfect channel, with no impairments like multipath, Doppler, CFO etc. The errors in symbol boundary detection are limited to about 3% of the symbol duration, as described in [10, 11]. According to one exemplary embodiment of the present disclosure, it is possible to manually configure the symbol boundary detector at the receiver to trigger at a pre-defined offset, so that its impact on the packet success rate can be reviewed. It is further possible to express the timing offset as a fraction of the symbol duration (256 samples). For example, an offset of 5 samples corresponds to $$\frac{5}{256} = 1.95\%.$$

Packet Success Rates:

FIG. 5(b) illustrates the packet success rates for timing offsets from 5 to 11 samples (1.95 to 4.29% of symbol duration. Exemplary embodiments of Vulcan can cope with timing offsets up to $$\frac{11}{256} \approx 4.29\%,$$

without any degradation in packet success rate. While 2D Triangulation performs begins to show degradation in packet success rates at timing offsets of $$6\frac{6}{256} \approx 2.34\%,$$

the packet success rate drops to 0 for timing offsets of about $$\frac{8}{256} \approx 3.12\%.$$

Vulcan improves packet success rates by 5× to 10× over Sinc interpolation.

Exemplary Discussion:

Under timing offsets, the magnitude of the channel is invariant. As a result, exemplary embodiments of Vulcan can perform reconstructions on about 10 to 30% of the REs to get very clean channel estimates. Sinc interpolation suffers severely from the Gibbs phenomenon, exacerbated by channel invariance across symbol indices. It is possible to repeat the experiment for smaller packet sizes, and observed that while the blow-out caused by the Gibbs phenomenon is lessened to some degree, the packet success rates are still relatively low (not plotted). Since the channel is time-invariant under timing offsets, the performance of DDFE is not plotted in this example.

RFO Model:

Recall that even after coarse grained CFO correction, RFO remains that is typically contained to within 1% of the subcarrier bandwidth ([14]). In order to simulate RFO, the time-domain complex baseband samples from the transmitter was passed through a frequency offset generator block, and on to the receiver. This block in GNU Radio was modified to set a constant offset, and the coarse grained frequency offset estimation and correction in Schmidl-Cox were disabled in order to precisely control the RFO that reaches the equalizer.

Packet Success Rates:

FIG. 5(c) shows the resulting packet success rates for RFO values of 0.6→1.1% of the subcarrier bandwidth. Exemplary embodiments of Vulcan can tolerate RFO of up to 1.1% without a significant performance hit. Meanwhile, DDFE and 2D Triangulation interpolation can tolerate only 0.6% of RFO, before the packet success rate drops sharply. Sinc interpolation gives a near 0% packet success rate due to the Gibbs phenomenon.

Exemplary Discussion:

In the presence of frequency offsets, the channel magnitude remains invariant, allowing Vulcan to perform reconstructed interpolation on 10→30% of the REs to generate clean channel estimates. At RFO of 1.3%, exemplary embodiments of Vulcan still gives a packet success rate of over 70% (not plotted). DDFE cannot cope with channel variations across symbol indices, as evident from the DDFE equalized symbols plotted in FIG. 6(d), for RFO set to 0.7%. The stale channel estimates (one symbol old) in DDFE lead to channel rotations and incorrect symbol decoding, in turn leading to the propagation of incorrect symbol estimates. DDFE is therefore best suited for highly frequency selective channels (with rapid channel variations across subcarrier indices), with very low variations across symbol indices. Channel invariance across subcarrier indices, combined with the fact that the number of subcarriers is large (FFT size is 256), leads to Sinc interpolation severely suffering from the Gibbs phenomenon.

Doppler Model:

To show the effects of Doppler frequency shift, the time-domain complex baseband samples from the transmitter are passed through a Doppler fading model (described below), and on to the receiver. This model is a part of the stock GNU Radio implementation, and is based on research by Alimohammad et al., [22]. The exemplary model uses a random walk to calculate the Doppler shifts experienced by every time-domain baseband sample, and uses the Sum of Sinusoids (SoS) method to simulate Rayleigh (NLOS) faded channels. Since the receiver cannot distinguish between frequency offsets caused by CFO and those caused by Doppler, the coarse grained frequency offset estimation and correction in Schmidl-Cox are disabled in order to measure the packet success rate in the presence of controlled Doppler.

Figure 7A:
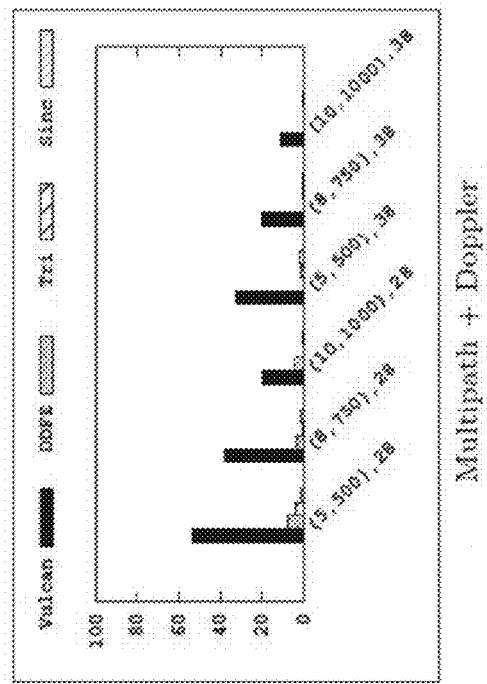
FIGS. 7(a)-7(c) are exemplary charts providing a comparison of packet success rates under various channel and Doppler conditions between various prior art interpolation methods and Vulcan interpolation according to one or more exemplary embodiments of the present disclosure.

Packet Success Rates:

FIG. 7(a) shows an exemplary chart with the packet success rate for six different combinations comprising two different velocities v (brisk walk of 4 mph and slow drive of 25 mph) and for three different carrier frequencies fc (28, 38, and 60 GHz). At 4 mph, exemplary embodiments of Vulcan provide a near 100% packet success rate, with marginal gains of 2-15% over DDFE, and 1-9% over 2D Triangulation. Such gains are more pronounced in the high Doppler region, when the velocity is 25 mph. Exemplary embodiments of Vulcan can provide a gain in packet success rate of over an order of magnitude over DDFE, and between 2.5 and 4.2× over 2D Triangulation. Sinc interpolation provides a very low 1-2% packet success rate.

Exemplary Discussion:

Under Doppler shifts, the magnitude of the channel changes much slower across symbol indices, as compared to the real and imaginary components. As a result, exemplary embodiments of Vulcan can perform reconstructed interpolation over 10→30% of the REs, resulting in very clean channel estimates. DDFE performs well only when the channel varies very slowly across time. Due to the frequency non-selectivity of Doppler shifts, the channel is near-constant across subcarriers, leading to the Gibbs phenomenon being exacerbated in Sinc interpolation.

The FFT size was 256 for these results, implying that each symbol was 256 time-domain samples long. Reducing the FFT size (e.g., to 64) would have resulted in the same Doppler shifts being tracked by four times as many symbols, leading to higher packet success rates. In other words, this would have had the equivalent effect of reducing the velocity or the carrier frequency by a factor of four, while keeping the FFT size constant. The effect of changing these design parameters (such as FFT size) are discussed below.

For example, the performance of various interpolation techniques has been examined, where the channel either changes across subcarriers (due to multipath interference or timing offsets) or across symbol indices (due to RFO or Doppler) in isolation. A further exemplary goal can be to repeat the experiments for when the channel changes across both subcarrier and symbol indices.

Exemplary Model:

It is possible to first pass the time-domain complex baseband samples from the transmitter through a Multi-path emulating dynamic FIR filter. Recall that a multipath profile is characterized by parameter set (n, max), where n of the multipath bins are used within a maximum delay spread of max ns. The time-domain samples from the output of the dynamic FIR filter are then passed through the Doppler model and finally through to the receiver. The coarse grained frequency offset correction can be disabled in Schmidl-Cox, so as to study the packet success rates in the face of controlled Doppler.

Figure 7B:
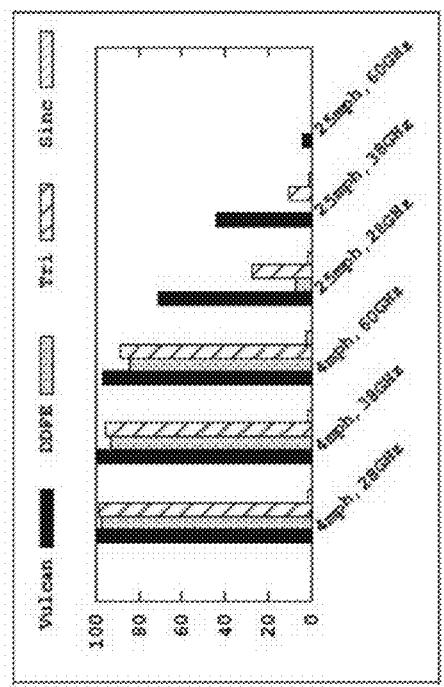

Packet Success Rates:

FIG. 7(b) shows the packet success rate for six different combinations comprising three different multipath profiles {n, max} (8, 500 ns; 8, 750 ns; and 10, 1000 ns) and two carrier frequencies (28 and 38 GHz). The velocity was fixed at 25 mph. Parameters ((n, max), fc) refer to a case where n multipath bins are occupied within a maximum spread of max ns, and fc is the carrier frequency in GHz. As FIG. 7(b) shows, exemplary embodiments of Vulcan improve performance over DDFE by 4× to 100×, with the greatest gains being in the high Doppler region. Relative to 2D Triangulation, exemplary embodiments of Vulcan improve the packet success rate by 15× to 100×, with the gains being greater in the high Doppler and high multipath regions. Similarly, the gains over Sinc interpolation are 15× to 50×.

Exemplary Discussion:

Since the magnitude varies slower than the real and imaginary components, exemplary embodiments of Vulcan are able to leverage reconstructed interpolation to provide cleaner estimates. Furthermore when the channel varies across both subcarrier and symbol indices, exemplary embodiments of Vulcan can have four choices in how to interpolate (see Procedure described above). These choices enable exemplary embodiments of Vulcan to avoid crests and troughs even when the channel changes at different rates across subcarrier and symbol indices, leading to cleaner channel estimates.

The exemplary improvement in packet success rate that exemplary embodiments of Vulcan provide over DDFE is narrowed down (or eliminated) when the channel changes very slowly across symbol indices. However, in the presence of very small RFO or additive noise, these gains by DDFE are quickly eliminated.

In the preceding description, the performance of Sinc interpolation was negatively affected by the fact that the channel was invariant in one direction (e.g., under timing offsets, the channel is invariant across symbol indices). This invariance exacerbates the Gibbs phenomenon, leading to large errors. However, in the experiments conducted, the channel can vary over both subcarrier and symbol indices. However, the Gibbs phenomenon still exists because of the large number of sub-carriers. Even using smaller FFT sizes (e.g., 64) as well as smaller packet sizes, the performance of Sinc interpolation improves but gains of Vulcan over Sinc interpolation still remained in the 2× to 5× range.

The preceding description provides how various interpolation techniques performed in the presence of only self-noise caused by channel estimation errors. Of further interest is their performance in the presence of additive channel noise. In particular, the question can be what SNR regimes the network has to operate in, for the self-noise to be a significant source of error.

Channel Model:

The time-domain complex base-band samples from the transmitter are passed through a Doppler emulating model to create self-noise. The output of this Doppler model is passed through an additive noise model (stock implemented in GNU Radio), and finally through to the receiver. The noise model is parameterized by the desired noise voltage. The carrier frequency was set to 28 GHz.

Figure 7C:
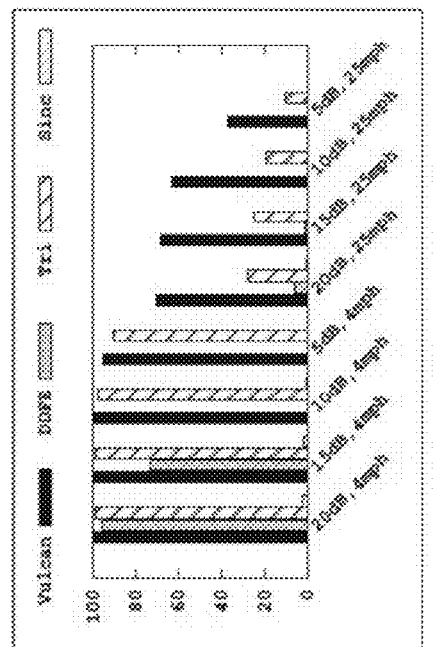

Packet Success Rates:

FIG. 7(c) shows an exemplary chart for the packet success rate performance for four different additive noise SNR values in the range commonly seen in wireless and cellular networks (20 dB, 15 dB, 10 dB, 5 dB) and two common Doppler scenarios (mobility of 4 mph and 25 mph Figure. The parameter set is (SNR, v), where SNR is the signal to additive noise ratio in dB and v is the velocity of motion in mph. At low Doppler (4 mph), exemplary embodiments of Vulcan and 2D Triangulation have packet success rates of over 95% irrespective of the SNR. However, the performance of DDFE drastically drops at SNR below 20 dB; at 10 dB, the packet success rate in DDFE is close to 0. At high Doppler (25 mph), Vulcan provides packet success rates of 2.5× to 3.5× higher than 2D Triangulation, with larger gains appearing in the lower SNR regimes. DDFE and Sinc interpolation provide packet success rates of close to 0.

Exemplary Discussion:

The gains provided by exemplary embodiments of Vulcan are more pronounced in the low SNR regime; this is because exemplary embodiments of Vulcan can reduce self-noise and provide cleaner channel estimates, thereby leaving greater head-room for the additive channel noise. DDFE can be feasible in only high SNR regimes, thereby rendering it useless in cellular networks that frequently operate in the <15 dB SNR regime. Sinc interpolation suffers from the Gibbs phenomenon that is overcome only if a less dense constellation (such as QPSK or 16-QAM) is used, thereby reducing the spectral efficiency.

Exemplary performance of the various exemplary embodiments discussed above illustrate the robustness of Vulcan across different phenomena (e.g., multipath interference, timing offsets, RFO, and Doppler) and channel variations across subcarrier and symbol indices. Other exemplary embodiments may comprise changing certain design parameters, such as FFT size, bandwidth, modulation, coding, etc. The performance of these other exemplary embodiments is summarize below, along with various associated intuitions and observations:

Effect of FFT Size:

Increasing the FFT size for the same channel bandwidth enables a more fine-grained tracking of the channel across subcarriers, since the same variations now span over a larger number of sub-carriers. This can assist, e.g., in mitigating channel changes across subcarriers caused by multipath interference and timing offsets. However, increasing the FFT size also leads to each time-domain symbol spanning a larger number of samples. Therefore, the changes across time (caused by RFO and Doppler) can now be tracked over a smaller number of symbols, leading to more rapid variations (and hence, interpolation errors) across symbols.

Exemplary Effect of Channel Bandwidth:

Keeping the FFT size fixed, increasing the channel bandwidth has the effect of increasing the Nyquist sampling rate, leading to a reduction in the duration of each time-domain symbol. This means that channel variations over time (caused by RFO and Doppler) are now tracked by a larger number of symbols, resulting in decreased interpolation errors across symbol indices. However, increasing the channel bandwidth leads to a proportionate increase in the sub-carrier bandwidth. Changes across frequency (caused by multipath interference and timing offsets) will be increased, but tracked by the same number of subcarriers, resulting in increased interpolation errors across sub-carriers. Furthermore, increasing the sampling period implies that the observed multipath profile gets spread out over a larger number of filter taps, thereby worsening the effect of multipath diversity. For example, this is equivalent to increasing n while keeping N fixed.

Exemplary Effect of Modulation:

If it is possible to utilize, instead of 64-QAM) a sparser constellation such as QPSK or 16-QAM, the symbol decoding errors will likely decrease. The interpolation benefits the most from a sparse constellation, since the Gibbs phenomenon can be insufficient to cause symbol decoding errors. In this exemplary case, the performance of exemplary embodiments of Vulcan are comparable to the performance of Sinc interpolation.

Exemplary Effect of Coding/Decoding Techniques:

Assuming a rate-5/6 convolutional code, either soft or hard decision Viterbi decoding could be employed at the receiver. Using soft decision Viterbi improves the packet success rate over hard decision Viterbi decoding, while using a lower rate code (e.g., rate-3/4 code) gets us even further gains. Furthermore, using a convolutional code with a larger number of states also improved the packet success rate. These observations are consistent with theory [16]. However, the obvious downside of using a lower rate code is wasted bandwidth.

Exemplary Effect of Packet Size:

Increasing the packet size generally leads to a drop in packet success rate. This drop is more significant when the channel exhibits rapid variations across symbol indices. This can be because shorter packets give Viterbi decoding a better chance at error correction. The drawback of using shorter packets can be that it increases the per-packet overheads like preambles and headers.

Exemplary Effect of Pilot Placement and Density:

If the channel varies very quickly over subcarriers (or symbol indices), increasing the pilot density across subcarriers (or symbol indices) improves performance. Increasing the pilot density improves the quality of channel estimates, but wastes bandwidth.

The exemplary discussion above provides a detailed evaluation of different channel interpolation techniques, and their performance in the face of various phenomena like multi-path interference, carrier frequency offsets, timing offsets, and Doppler. It is possible to further evaluate the performance of various exemplary embodiments in the context of other interpolation and/or equalization techniques with additional changes to design parameters including, e.g., carrier frequency, channel bandwidth, and Tx and Rx gains. This can be done by a test bed comprising XCVR 2450 daughter boards that are limited to 2.4 GHz and 5.1 GHz carrier frequencies.

In each experiment, it is possible to run all four receivers in parallel to compare their performance. The CPU on the host computer becomes a bottleneck for bandwidth (and sampling frequency) above 5 MHz. As a result, the channel bandwidths that can be considered in our experiments are: a) 1 MHz; b) 2 MHz; and c) 5 MHz. It is beneficial to measure packet success ratios in different SNR regimes, although it may be difficult to control the amount of noise in the wireless channel. It is possible to change the gains used by the transmit and receive front-ends between: a) 30 dB; and b) 15 dB; In all experiments, it is possible to fix the FFT size at 64, CP length at 16 samples, and use a rate 5/6 punctured convolutional code paired with 64-QAM modulation. The packet size is 346 uncoded bytes, corresponding to 12 post-coded time-domain symbols. The two USRP devices are placed in different rooms on the same office floor, and do not have line of sight between them.

Figure 8A:
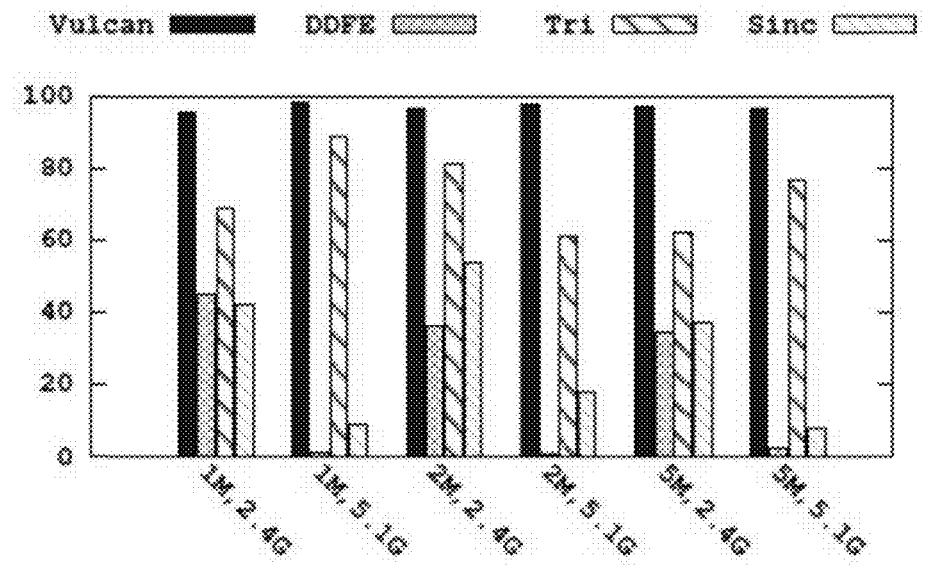
FIGS. 8(a) and 8(b) are exemplary charts providing a comparison of over-the-air packet success rates for various sets of bandwidth and carrier frequency, and for different front-end gains.
Figure 8B:
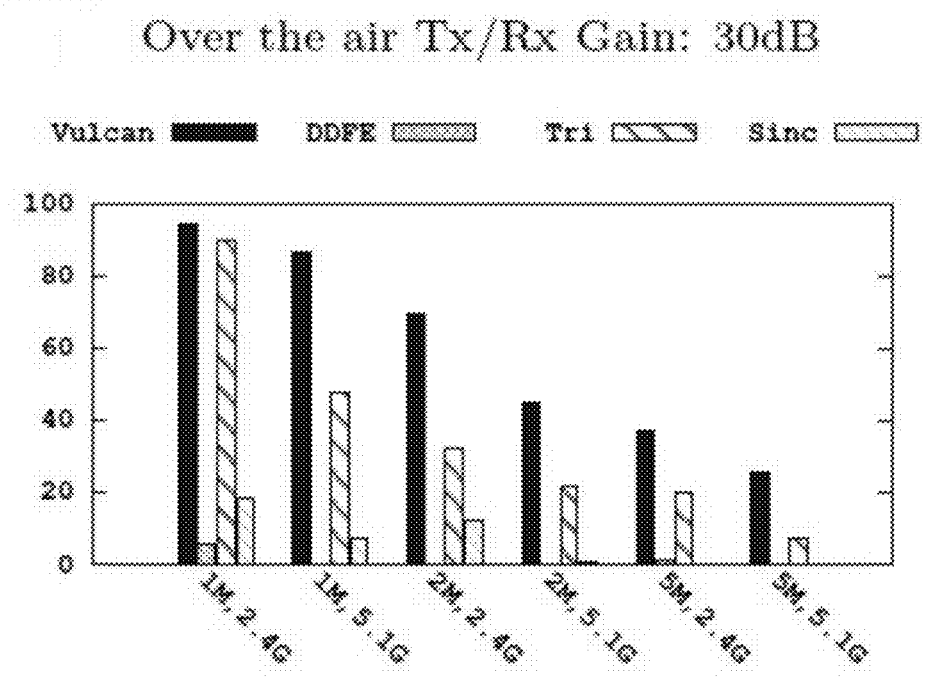

FIG. 8($a$) shows an exemplary chart of the resulting packet success rates for transmit and receive gains set to 30 dB each, with parameter set (B W, fc) representing the combination of bandwidth and carrier frequency. At fc=2.4 GHz, Vulcan provides gains of up to 2.8×, 56%, and 2.6× over DDFE, 2D Triangulation, and Sinc interpolation respectively. When the carrier frequency is increased to 5.1 GHz, these gains increase to 137×, 60%, and 13×. When the carrier frequency is increased from 2.4 GHz to 5.1 GHz, the performance of DDFE and Sinc deteriorates very rapidly, as compared to that of 2D Triangulation and exemplary embodiments of Vulcan. This is because the concrete walls attenuate the 5.1 GHz signals to a greater degree, leading to a lowering in SNR at the receiver. As discussed above, sinc interpolation operates well only in very high SNR.

FIG. 8($b$) shows an exemplary chart of the resulting packet success rates for transmit and receive gains set to 15 dB each, with parameter set (BW, fc) representing the combination of bandwidth and carrier frequency. It is possible to make the preliminary observation that under reduced SNR, the performance of DDFE and Sinc interpolation is further reduced; further, 2D Triangulation and exemplary embodiments of Vulcan can be analyzed. At 2.4 GHz, the increase in packet success rate of exemplary embodiments of Vulcan over 2D Triangulation is up to 2.14× (recall that with transmit and receive gains set to 30 dB, this figure was 56%). Similarly at 5.1 GHz, the increase in packet success rate of Vulcan over 2D Triangulation is up to 3.5× (recall that with transmit and receive gains set to 30 dB, this figure was 60%). These exemplary results are consistent with those presented above, where the gains of exemplary embodiments of Vulcan are more pronounced in regimes with lower SNR.

In summary, these over-the-air experiments show that exemplary embodiments of Vulcan provide significant increases in the packet success rate over competing techniques in the 2.4 to 5 GHz range. For at least the reasons discussed herein, these exemplary gains are expected to be even larger over mmW links (above 28 GHz) due to ability of exemplary embodiments of Vulcan to cope with phenomena like multipath richness and exacerbated Doppler, as shown through measurement-driven channel emulations.

In other exemplary embodiments, the transmitted 2.4- or 5.1-GHz signal from the USRP can be treated as an intermediate frequency (IF), up-converted to a mmW frequency (e.g., 28, 38, 60 GHz) using external mixers, and then down-converted back to IF at the receiver. This would facilitate a measurement of the performance of Vulcan over mmW in the real world, where phenomena like multi-path diversity are exacerbated. Other exemplary embodiments may include multiple-input multiple-output (MIMO) antennas and processing techniques, where Vulcan techniques can be especially helpful due to the high sensitivity of MIMO performance to the quality of channel estimates.

Thus, while next generation wireless and cellular networks are widely expected to operate on mmW, these signals are badly behaved because of diverse multi-path, exacerbated Doppler, and RFO. Traditional channel interpolation techniques do not adequately compensate for these channel variations, especially in the presence of high-rate modulations. Exemplary embodiments of Vulcan interpolation overcomes the weaknesses inherent in these traditional techniques by using a combination of native and reconstructed interpolation, which exploit the inherent (and previously overlooked) relationship between the real, imaginary, and absolute components of the wireless channel. Experiments performed through measurement-driven channel models as well as over-the-air indicate that exemplary embodiments of Vulcan improve performance by a factor of 50% to 10×, while remaining computationally efficient. Exemplary embodiments of Vulcan can improve the spectral efficiency by not requiring a high pilot density, and enabling dense constellations.

Although various embodiments are described herein above as methods, the person of ordinary skill will readily comprehend that such methods may be embodied by various combinations of hardware and software in various systems, computing devices, control devices, apparatuses, non-transitory computer-readable media, etc. FIG. 9 shows a block diagram of an exemplary device or apparatus utilizing certain embodiments of the present disclosure, including execution of instructions on the computer-readable medium comprising various Vulcan interpolation techniques according to one or more of the embodiments described herein above. Embodiments of the exemplary device or apparatus shown in FIG. 9 and described below may include an end-user device (e.g., mobile phone or tablet), a subscriber terminal (e.g., for machine-to-machine communications), a base station (e.g., of a cellular system), an access point (e.g, of a wireless LAN), or any other type of device or apparatus that would benefit from estimating the effects of the communication channel on a received signal.

Exemplary device 900 can comprise a processor 910 that can be operably connected to a program memory 920 and/or a data memory 930 via a bus 970 that may comprise parallel address and data buses, serial ports, or other methods and/or structures known to those of ordinary skill in the art. Program memory 920 can comprise software code or program executed by processor 910 that facilitates, causes and/or programs exemplary device 900 to communicate using one or more wired or wireless communication protocols, including one or more wireless communication protocols standardized by 3GPP, 3GPP2, or IEEE, such as those commonly known as LTE, UMTS, HSPA, GSM, GPRS, EDGE, 1×RTT, CDMA2000, 802.11, WiFi, HDMI, USB, Firewire, etc., or any other protocols utilized in conjunction with radio transceiver 940, user interface 950, and/or host interface 960.

Program memory 920 can also comprises software code executed by processor 910 to control the functions of device 900, including configuring and controlling various components such as radio transceiver 940, user interface 950, and/or host interface 960. Program memory 920 may also comprise an application program for various Vulcan interpolation techniques according to one or more of the embodiments described herein above. Such software code may be specified or written using any known or future developed programming language, such as e.g. Java, C++, C, Objective C, HTML, XHTML, and Assembler, as long as the desired functionality, e.g., as defined by the implemented method steps, is preserved. In addition or alternatively, program memory 920 may comprise an external storage arrangement (not shown) remote from device 900, from which the instructions can be downloaded into program memory 920 located within or removably coupled to device 900, so as to enable execution of such instructions.

Data memory 930 may comprise memory area for processor 910 to store variables used in protocols, configuration, control, and other functions of device 900, including various Vulcan interpolation techniques according to one or more of the embodiments described herein above. Moreover, program memory 920 and/or data memory 930 may comprise non-volatile memory (e.g., flash memory), volatile memory (e.g., static or dynamic RAM), or a combination thereof. Furthermore, data memory 930 may comprise a memory slot by which removable memory cards in one or more formats (e.g., SD Card, Memory Stick, Compact Flash, etc.) may be inserted and removed. Persons of ordinary skill in the art will recognize that processor 910 may comprise multiple individual processors (e.g., multi-core processors), each of which implements a portion of the functionality described above. In such case, multiple individual processors may be commonly connected to program memory 920 and data memory 930 or individually connected to multiple individual program memories and or data memories. More generally, persons of ordinary skill in the art will recognize that various protocols and other functions of device 900 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio transceiver 940 may comprise radio-frequency transmitter and/or receiver functionality that enables device 900 to communicate with other equipment supporting like wireless communication standards. In an exemplary embodiment, radio transceiver 940 includes an LTE transmitter and receiver that enable device 900 to communicate with various Long Term Evolution (LTE) networks (also known as "4G") according to standards promulgated by 3GPP. In some exemplary embodiments of the present disclosure, radio transceiver 940 includes circuitry, firmware, etc. necessary for device 900 to communicate with various UMTS and/or GSM/EDGE networks, also according to 3GPP standards. In some exemplary embodiments of the present disclosure, radio transceiver 940 includes circuitry, firmware, etc. necessary for device 900 to communicate with various CDMA2000 networks, according to 3GPP2 standards. In some exemplary embodiments of the present disclosure, radio transceiver 940 is capable of communicating using radio technologies that operate in unlicensed frequency bands, such as IEEE 802.11 WiFi that operates using frequencies in the regions of 2.4 and/or 5.6 GHz. In some exemplary embodiments of the present disclosure, radio transceiver 940 may comprise a transceiver that is capable of wired communication, such as by using IEEE 802.3 Ethernet technology. The functionality particular to each of these embodiments may be coupled with or controlled by other circuitry in device 900, such as processor 910 executing protocol program code stored in program memory 920.

User interface 950 may take various forms depending on the particular embodiment of device 900. In some exemplary embodiments of the present disclosure, user interface 950 may comprise a microphone, a loudspeaker, slidable buttons, depressable buttons, a display, a touchscreen display, a mechanical or virtual keypad, a mechanical or virtual keyboard, and/or any other user-interface features commonly found on mobile phones. In other embodiments, device 900 may comprise a tablet computing device (such as an iPad® sold by Apple, Inc.) including a larger touchscreen display. In such embodiments, one or more of the mechanical features of user interface 950 may be replaced by comparable or functionally equivalent virtual user interface features (e.g., virtual keypad, virtual buttons, etc.) implemented using the touchscreen display, as familiar to persons of ordinary skill in the art. In other embodiments, device 900 may be a digital computing device, such as a laptop computer, desktop computer, workstation, etc. that comprises a mechanical keyboard that may be integrated, detached, or detachable depending on the particular embodiment. Such a digital computing device may also comprise a touch screen display. Many exemplary embodiments of device 900 having a touch screen display are capable of receiving user inputs, including inputs related to computing a solution to one or more combinatorial optimization problems found in one or more applications described herein or known to persons of ordinary skill in the art.

In some exemplary embodiments of the present disclosure, device 900 may comprise an orientation sensor, which can be used to sense when the user has changed the physical orientation of the device 900's touch screen display. An indication signal from the orientation sensor may be available to any application program executing on device 900, such that an application program may change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device.

Control interface 960 of device 900 can take various forms depending on the particular embodiment of device 900 and of the particular interface requirements of the hardware under control of device 900. For example, control interface 960 can comprise an RS-232 interface, an RS-485 interface, a USB interface, an HDMI interface, a Bluetooth interface, or the like. In some exemplary embodiments of the present disclosure, control interface 960 may comprise an IEEE 802.3 Ethernet interface such as described above. In some exemplary embodiments of the present disclosure, control interface 960 may comprise analog interface circuitry including, for example, one or more digital-to-analog (D/A) and/or analog-to-digital (A/D) converters.

Persons of ordinary skill in the art will recognize the above list of features, interfaces, and radio-frequency communication standards is merely exemplary and not limiting to the scope of the present disclosure. In other words, device 900 may comprise more functionality than is shown in FIG. 9 including, for example, a video and/or still-image camera, microphone, media player, etc. Moreover, radio transceiver 940 may include circuitry necessary to communicate using additional radio-frequency communication standards including Bluetooth, GPS, and/or others. Accordingly, processor 910 may execute software code stored in program memory 920 to control such additional functionality.

As described herein, a device or apparatus may be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. A device or apparatus may be regarded as a device or apparatus, or as an assembly of multiple devices and/or apparatuses, whether functionally in cooperation with or independently of each other. Moreover, devices and apparatuses may be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and numbered paragraphs thereof, can be used synonymously in certain instances, including, but not limited to, e.g., data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. The following references, numbered to correspond to their citations in the specification above, are also incorporated herein by reference in their entireties.

[1] Cisco Systems, "Cisco Visual Network Index: Global mobile traffic forecast update (2012-2017)," 2012.
[2] Nokia Siemens Networks, "2020: Beyond 4G Radio Evolution for the Gigabit Experience," 2012.
[3] Theodore Rappaport et al., "Millimeter Wave Mobile Communications for 5G Cellular: It Will Work!," *Electronics Letters*, vol. 40, no. 23, 2004.
[4] Z. Pi and F. Khan, "An introduction to millimeter-wave mobile broadband systems," *Communications Magazine, IEEE*, vol. 49, June 2011.
[5] M. Cudak, A. Ghosh, T. Kovarik, R. Ratasuk, T. Thomas, F. Vook, and P. Moorut, "Moving towards mmwave-based beyond-4g (b-4g) technology," in *Vehicular Technology Conference (VTC Spring), 2013 IEEE 77th*, 2013.
[6] D. Halperin, S. Kandula, J. Padhye, P. Bahl, and D. Wetherall, "Augmenting data center networks with multi-gigabit wireless links," in *Proceedings of ACM SIGCOMM 2011*.
[7] Robert Daniels, James Murdock, Theodore Rappaport, and Robert Heath, Jr., "60 GHz Wireless: Up Close and Personal," *IEEE Microwave Magazine*, 2010.
[8] Gerard J. M. Janssen, Patrick A. Stigter, and Ramjee Prasad, "Wideband Indoor Channel Measurements and BER Analysis of Frequency Selective Multipath Channels at 2.4, 4.75, and 11.5 GHz," *IEEE Transactions on Communications Vol. 44, No. 10*, 1996.
[9] Theodore Rappaport, et al., "28 GHz Propagation Measurements for Outdoor Cellular Communications Using Steerable Beam Antennas in New York City," in *IEEE International Conference on Communications (ICC)*, 2013.
[10] H. Minn, M. Zeng, and V. K. Bhargava, "On Timing Offset Estimation for OFDM Systems," *IEEE Communications Letters, Vol. 4, No. 7*, 2000.
[11] Tiejun Lv, Hua Li, and Jie Chen, "Joint Estimation of Symbol Timing and Carrier Frequency Offset of OFDM Signals Over Fast Time-Varying Multipath Channels," *IEEE Transactions on Signal Processing Vol.* 53, 2005.
[12] J.-J. van de Beek, M. Sandell, and P. Borjesson, "Ml estimation of time and frequency offset in ofdm systems," *Signal Processing, IEEE Transactions on*, vol. 45, no. 7, 1997.
[13] Timothy Schmidl and Donald Cox, "Robust frequency and timing synchronization for OFDM," *IEEE Transactions on Communications*, vol. 45, December 1997.
[14] Qi Wang, Sebastian Caban, Christian Mehlfuhrer and Markus Rupp, "Measurement Based Throughput Evaluation of Residual Frequency Offset Compensation in WiMAX," *51st Annual Symposium ELMAR*, 2009.
[15] Alan Oppenheim, Alan Willsky, with Hamid Nawab, "Signals and Systems (Second Ed.)," *Prentice Hall*, 1997.
[16] John G. Proakis and Masoud Salehi, "Digital Communications (Fifth Edition)," *McGraw Hill*, 2008. [17] Kenneth Hoffman, "Banach Spaces of Analytic Functions (Dover Publications)," 2007.
[18] Abdul Jerri, "The Gibbs Phenomenon in Fourier Analysis, Splines and Wavelet Approximations," 1998.
[19] David Smalley, "Equalization Concepts: A Tutorial," *Application Report, Texas Instruments*, 1994.
[20] Theodore Rappaport et al., "28 GHz Millimeter Wave Cellular Communication Measurements for Reflection and Penetration Loss in and around Buildings in New York City," in *IEEE International Conference on Communications (ICC)*, 2013.
[21] Theodore Rappaport, et al., "28 GHz Angle of Arrival and Angle of Departure Analysis for Outdoor Cellular Communications using Steerable Beam Antennas in New York City," in *IEEE Vehicular Technology Conference VTC*, 2013.
[22] A. Alimohammad, S. F. Bard, B. F. Cockburn, C. Schlegel, "Compact Rayleigh and Rician fading simulator based on random walk processes," in *IET Communications*, 2008.

What is claimed is:

1. A non-transitory, computer-readable medium providing computer-executable instructions for estimating a response of a communication channel, wherein, when executed by a computer arrangement, the instructions specifically configure the computer arrangement to execute procedures comprising:
receiving, via the communication channel, a signal comprising a plurality of symbols, each symbol comprising (i) one or more pilot sub-carriers and (ii) one or more non-pilot sub-carriers;

for each of the one or more pilot sub-carriers, determining a pilot sub-carrier response and a pilot sub-carrier metric; and
for each of the one or more non-pilot sub-carriers:
determining a non-pilot sub-carrier metric; and
if the non-pilot sub-carrier metric satisfies a predetermined criterion, determining a particular component of a non-pilot sub-carrier response as a function of components, different from the particular component, of one or more pilot sub-carrier responses.

2. The computer-readable medium of claim 1, wherein the instructions further configure the computer arrangement to:
for each of the one or more non-pilot sub-carriers:
if the non-pilot sub-carrier metric does not satisfy the predetermined criterion, determine the particular component of the non-pilot sub-carrier response as a function of the particular component of one or more pilot sub-carrier responses.

3. The computer-readable medium of claim 1, wherein the instructions configure the computer arrangement to determine the response, the pilot sub-carrier metric, and the non-pilot sub-carrier metric in a particular dimension.

4. The computer-readable medium of claim 3, wherein the particular dimension is at least one of a symbol dimension or a sub-carrier dimension.

5. The computer-readable medium of claim 3, wherein the pilot sub-carrier metric comprises a rate of slope change of the pilot sub-carrier response proximate to the pilot sub-carrier in the particular dimension.

6. The computer-readable medium of claim 5, wherein the non-pilot sub-carrier metric comprises a weighted average of pilot sub-carrier metrics corresponding to one or more pilot sub-carriers proximate to the non-pilot sub-carriers in the particular dimension.

7. The computer-readable medium of claim 1, wherein the predetermined criterion comprises the particular component of the non-pilot sub-carrier metric being less than a function of a plurality of other components of the non-pilot sub-carrier metric.

8. The computer-readable medium of claim 7, wherein:
the particular component comprises a real component; and
if the predetermined criterion is satisfied, the computer arrangement is configured to determine the real component of the non-pilot sub-carrier response as a function of imaginary and absolute value components of the one or more pilot sub-carrier responses.

9. The computer-readable medium of claim 7, wherein:
the particular component comprises an imaginary component; and
if the predetermined criterion is satisfied, the computer arrangement is configured to determine the imaginary component of the non-pilot sub-carrier response as a function of real and absolute value components of the one or more pilot sub-carrier responses.

10. The computer-readable medium of claim 1, wherein:
each of the one or more pilot sub-carrier responses, the one or more pilot sub-carrier metrics, and the one or more non-pilot sub-carrier metrics comprises a particular dimension and a further dimension;
for each of the one or more non-pilot sub-carriers:
if the non-pilot sub-carrier metric in the particular dimension satisfies the predetermined criterion, determine the particular component of the non-pilot sub-carrier response as a function of components, different from the particular component, of one or more pilot sub-carrier responses in the particular dimension.

11. The computer-readable medium of claim 2, wherein:
each of the one or more pilot sub-carrier responses, the one or more pilot sub-carrier metrics, and the one or more non-pilot sub-carrier metrics comprises a particular dimension and a further dimension;
for each of the one or more non-pilot sub-carriers:
if the non-pilot sub-carrier metric does not satisfy the predetermined criterion based on the non-pilot sub-carrier metric in the particular dimension satisfying a first criterion, determine the particular component of the non-pilot sub-carrier response as a function of the particular component of one or more pilot sub-carrier responses in the particular dimension; or
if the non-pilot sub-carrier metric does not satisfy the predetermined criterion based on the non-pilot sub-carrier metric in the further dimension satisfying the first criterion, determine the particular component of the non-pilot sub-carrier response as a function of the particular component of one or more pilot sub-carrier responses in the further dimension.

12. The computer-readable medium of claim 10, wherein the particular dimension is one of a symbol dimension or a sub-carrier dimension, and the further dimension is a different one of a symbol dimension or a sub-carrier dimension.

13. The computer-readable medium of claim 10, wherein the pilot sub-carrier metric comprises a rate of slope change of the pilot sub-carrier response proximate to the pilot sub-carrier in the particular dimension.

14. The computer-readable medium of claim 10, wherein the non-pilot sub-carrier metric comprises a weighted average of pilot sub-carrier metrics corresponding to a portion of the one or more pilot sub-carriers, the portion being proximate to the non-pilot sub-carrier in the particular dimension.

15. The computer-readable medium of claim 11, wherein the first criterion comprises the particular component of the non-pilot sub-carrier metric in the particular dimension being less than all of: a function of other components of the non-pilot sub-carrier metric in the particular dimension, the particular component of the non-pilot sub-carrier metric in the further dimension, and the function of other components of the non-pilot sub-carrier metric in the further dimension.

16. The computer-readable medium of claim 10, wherein the predetermined criterion comprises the function of other components of the non-pilot sub-carrier metric in a particular dimension being less than all of: the particular component of the non-pilot sub-carrier metric in the particular dimension, the particular component of the non-pilot sub-carrier metric in the further dimension, and the function of other components of the non-pilot sub-carrier metric in the further dimension.

17. The computer-readable medium of claim 10, wherein:
the particular component comprises a real component; and
if the predetermined criterion is satisfied, the computer arrangement is configured to determine the real component of the non-pilot sub-carrier response as a function of imaginary and absolute value components of the one or more pilot sub-carrier responses.

18. The computer-readable medium of claim 10, wherein:
the particular component comprises an imaginary component, and
if the predetermined criterion is satisfied, the computer arrangement is configured to determine the imaginary component of the non-pilot sub-carrier response as a function of the real and absolute value components of the one or more pilot sub-carrier responses.

19. A communication apparatus, comprising:
a receiver;
a computer arrangement; and
a non-transitory, computer-readable medium comprising computer-executable instructions that, when executed by the computer arrangement, cause the apparatus to:
  receive, via the communication channel, a signal comprising a plurality of symbols, each symbol comprising (i) one or more pilot sub-carriers and (ii) one or more non-pilot sub-carriers;
  for each of the one or more pilot sub-carriers, determine a pilot sub-carrier response and a pilot sub-carrier metric; and
  for each of the one or more non-pilot sub-carriers:
    determine a non-pilot sub-carrier metric; and
    if the non-pilot sub-carrier metric satisfies a predetermined criterion, determine a particular component of a non-pilot sub-carrier response as a function of components, different from the particular component, of one or more pilot sub-carrier responses.

20. The communication apparatus of claim 19, wherein the non-transitory, computer-readable medium further comprises computer-executable instructions that, when executed by the computer arrangement, cause the apparatus to:
  for each of the one or more non-pilot sub-carriers:
    if the non-pilot sub-carrier metric does not satisfy the predetermined criterion, determine the particular component of the non-pilot sub-carrier response as a function of the particular component of one or more pilot sub-carrier responses.

21. The communication apparatus of claim 19, wherein
  each of the one or more pilot sub-carrier responses, the one or more pilot sub-carrier metrics, and the one or more non-pilot sub-carrier metrics comprises a particular dimension and a further dimension;
  for each of the one or more non-pilot sub-carriers, the instructions configure the computer arrangement to:
    if the non-pilot sub-carrier metric in the particular dimension satisfies the predetermined criterion, determine the particular component of the non-pilot sub-carrier response as a function of components, different from the particular component, of one or more pilot sub-carrier responses in the particular dimension.

22. A computer-implemented method for estimating a response of a communication channel, comprising:
  receiving, via the communication channel, a signal comprising a plurality of symbols, each symbol comprising (i) one or more pilot sub-carriers and (ii) one or more non-pilot sub-carriers;
  for each of the one or more pilot sub-carriers, determining a pilot sub-carrier response and a pilot sub-carrier metric; and
  for each of the one or more non-pilot sub-carriers:
    determining a non-pilot sub-carrier metric; and
    if the non-pilot sub-carrier metric satisfies a predetermined criterion, determining a particular component of a non-pilot sub-carrier response as a function of components, different from the particular component, of one or more pilot sub-carrier responses.

23. The computer-implemented method of claim 22, further comprising:
  for each of the one or more non-pilot sub-carriers:
    if the non-pilot sub-carrier metric does not satisfy the predetermined criterion, determining the particular component of the non-pilot sub-carrier response as a function of the particular component of one or more pilot sub-carrier responses.

24. The computer-implemented method of claim 22, wherein
  each of the one or more pilot sub-carrier responses, the one or more pilot sub-carrier metrics, and one or more the non-pilot sub-carrier metrics comprise a particular dimension and a further dimension;
  for each of the one or more non-pilot sub-carriers:
    if the non-pilot sub-carrier metric in the particular dimension satisfies the predetermined criterion, the particular component of the non-pilot sub-carrier response is determined as a function of components, different from the particular component, of one or more pilot sub-carrier responses in the particular dimension.

25. The computer-implemented method of claim 23, wherein:
  each of the one or more pilot sub-carrier responses, the one or more pilot sub-carrier metrics, and the one or more non-pilot sub-carrier metrics in comprises a particular dimension and a further dimension;
  for each of the one or more non-pilot sub-carriers:
    if the non-pilot sub-carrier metric does not satisfy the predetermined criterion based on the non-pilot sub-carrier metric in the particular dimension satisfying a first criterion, determining the particular component of the non-pilot sub-carrier response as a function of the particular component of one or more pilot sub-carrier responses in the particular dimension; and
    if the non-pilot sub-carrier metric does not satisfy the predetermined criterion based on the non-pilot sub-carrier metric in the further dimension satisfying the first criterion, determining the particular component of the non-pilot sub-carrier response as a function of the particular component of one or more pilot sub-carrier responses in the further dimension.

26. The communication apparatus of claim 20, wherein
  each of the one or more pilot sub-carrier responses, the one or more pilot sub-carrier metrics, and the one or more non-pilot sub-carrier metrics comprises a particular dimension and a further dimension;
  for each of the one or more non-pilot sub-carriers, the instructions configure the computer arrangement to:
    if the non-pilot sub-carrier metric does not satisfy the predetermined criterion based on the non-pilot sub-carrier metric in the particular dimension satisfying a first criterion, determine the particular component of the non-pilot sub-carrier response as a function of the particular component of one or more pilot sub-carrier responses in the particular dimension; and
    if the non-pilot sub-carrier metric does not satisfy the predetermined criterion based on the non-pilot sub-carrier metric in the further dimension satisfying the first criterion, determine the particular component of the non-pilot sub-carrier response as a function of the particular component of one or more pilot sub-carrier responses in the further dimension.

* * * * *